United States Patent
Kim

(10) Patent No.: US 9,722,410 B2
(45) Date of Patent: Aug. 1, 2017

(54) BURNING PROTECTION CIRCUIT, DISPLAY DEVICE AND METHOD OF PROTECTING A DISPLAY DEVICE FROM BURNING

(71) Applicant: Samsung Display Co., Ltd., Yongin, Gyeonggi-do (KR)

(72) Inventor: Do-Ik Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 126 days.

(21) Appl. No.: 14/529,104

(22) Filed: Oct. 30, 2014

(65) Prior Publication Data

US 2015/0229117 A1 Aug. 13, 2015

(30) Foreign Application Priority Data

Feb. 13, 2014 (KR) .................. 10-2014-0016505

(51) Int. Cl.
*H02H 3/08* (2006.01)
*G09G 3/20* (2006.01)
*G06F 1/28* (2006.01)

(52) U.S. Cl.
CPC ............. *H02H 3/08* (2013.01); *G06F 1/28* (2013.01); *G09G 3/20* (2013.01);
(Continued)

(58) Field of Classification Search
CPC ...... H02H 3/08; G09G 3/20; G09G 2330/025; G09G 2330/027; G09G 2320/029; G09G 2330/00; G09G 2330/04; G06F 1/28
See application file for complete search history.

(56) References Cited

U.S. PATENT DOCUMENTS 5,829,263 A * 11/1998 Park ..................... F25C 1/04
  222/59
2003/0063081 A1* 4/2003 Kimura ............... G09G 3/3233
  345/211

(Continued)

FOREIGN PATENT DOCUMENTS

EP 2 637 159 A1 9/2013
KR 20-0381681 Y1 4/2005

(Continued)

OTHER PUBLICATIONS

Korean Patent Abstracts No. 10-2006-0038867 A for Patent No. KR 10-0590241 B1, Jun. 19, 2006, 1 Page.

(Continued)

*Primary Examiner* — Charles Hicks
(74) *Attorney, Agent, or Firm* — Lewis Roca Rothgerber Christie LLP

(57) ABSTRACT

A burning protection circuit of a display device includes a plurality of current measuring units and a control unit. The display device includes a plurality of pixel blocks. Each of the pixel blocks includes a plurality of pixels. The pixel blocks are respectively supplied with power through a plurality of power supply lines. The current measuring units are configured to respectively generate a plurality of measured current values by respectively measuring a plurality of currents respectively supplied to the pixel blocks through the power supply lines. The control unit is configured to respectively generate a plurality of block data for the pixel blocks based on pixel data for the pixels of corresponding ones of the pixel blocks, and determine whether an overcurrent occurs based on a plurality of ratios of the measured current values to corresponding ones of the block data.

20 Claims, 14 Drawing Sheets

(52) U.S. Cl.
CPC ... *G09G 2320/029* (2013.01); *G09G 2330/00* (2013.01); *G09G 2330/025* (2013.01); *G09G 2330/027* (2013.01); *G09G 2330/04* (2013.01)

(56) References Cited

U.S. PATENT DOCUMENTS

| | | |
|---|---|---|
| 2003/0122813 A1 | 7/2003 | Ishizuki et al. |
| 2006/0238943 A1 | 10/2006 | Awakura et al. |
| 2010/0277513 A1 | 11/2010 | Byun |
| 2011/0298396 A1 | 12/2011 | Kimura |
| 2012/0293562 A1 | 11/2012 | Park |
| 2013/0002736 A1 | 1/2013 | Park |

FOREIGN PATENT DOCUMENTS

| | | |
|---|---|---|
| KR | 10-0590241 B1 | 6/2006 |
| KR | 10-2013-0003247 A | 1/2013 |
| KR | 2013-0062658 | 5/2013 |
| KR | 10-2013-0096002 A | 8/2013 |
| KR | 10-2014-0141191 | 12/2014 |

OTHER PUBLICATIONS

EPO Office action dated Jun. 9, 2016, for corresponding European Patent application 14193040.4, (10 pages).

\* cited by examiner

BURNING PROTECTION CIRCUIT, DISPLAY DEVICE AND METHOD OF PROTECTING A DISPLAY DEVICE FROM BURNING

CROSS REFERENCE TO RELATED APPLICATION

This application claims priority to and the benefit of Korean Patent Application No. 10-2014-0016505, filed on Feb. 13, 2014, the entire content of which is hereby incorporated by reference.

BACKGROUND

1. Field

Aspects of embodiments of the present invention relate to display devices. More particularly, aspects of embodiments of the present invention relate to burning protection circuits, display devices, and methods of protecting display devices from burning.

2. Description of the Related Art

Recently, various flat panel display devices having reduced weight and volume have been developed. Flat panel display devices include liquid crystal display (LCD) devices, field emission display (FED) devices, plasma display panels (PDPs), organic light emitting display devices, etc. Flat panel display devices may use relatively high currents compared to other electronic devices. Accordingly, when cracks occur in display panels, or power supply voltage lines are abnormally shorted, the flat panel display devices may be vulnerable to burning or catching fire caused by overcurrents.

SUMMARY

Example embodiments provide for a burning protection circuit of a display device capable of reducing or preventing burning of the display device. Further embodiments provide for a display device capable of reducing or preventing burning of the display device. Still further embodiments provide a method of protecting a display device from burning.

According to an embodiment of the present invention, a burning protection circuit of a display device is provided. The display device includes a plurality of pixel blocks. Each of the pixel blocks includes a plurality of pixels. The pixel blocks are respectively supplied with power through a plurality of power supply lines. The burning protection circuit includes: a plurality of current measuring units configured to respectively generate a plurality of measured current values by respectively measuring a plurality of currents respectively supplied to the pixel blocks through the power supply lines; and a control unit configured to respectively generate a plurality of block data for the pixel blocks based on pixel data for the pixels of corresponding ones of the pixel blocks, and determine whether an overcurrent occurs based on a plurality of ratios of the measured current values to corresponding ones of the block data.

The control unit may be further configured to determine that the overcurrent occurs when at least one of the ratios exceeds a threshold value.

The control unit may be further configured to cut off the power supplied to the pixel blocks when the control unit determines that the overcurrent occurs.

Each of the current measuring units may be further configured to generate a plurality of individual measured current values by measuring a plurality of individual currents supplied to a corresponding one of the pixel blocks through a corresponding one of the power supply lines during a time period. The control unit may be further configured to generate a plurality of individual block data for each pixel block of the pixel blocks based on the pixel data for the pixels of the pixel block during the time period, generate a plurality of average block data by respectively averaging the individual block data for the pixel blocks, generate a plurality of average measured current values by respectively averaging the individual measured current values for the pixel blocks, and determine whether the overcurrent occurs based on a plurality of average ratios of the average measured current values to corresponding ones of the average block data.

The time period may correspond to one frame.

Each of the current measuring units may include: a current sensing device configured to sense a corresponding one of the currents flowing through a corresponding one of the power supply lines, and generate a voltage corresponding to the corresponding one of the currents; and a converter configured to convert the voltage generated by the current sensing device into a corresponding one of the measured current values.

The current sensing device may include a Hall device or a sense resistor.

The control unit may include: a block data calculating unit configured to respectively generate the block data for the pixel blocks based on the pixel data for the pixels of corresponding ones of the pixel blocks; and an overcurrent determining unit configured to receive the measured current values from the current measuring units, receive the block data from the block data calculating unit; generate the ratios; and determine whether the overcurrent occurs by comparing each of the ratios with a threshold value.

The control unit may include: a block data calculating unit configured to generate a plurality of individual block data for each pixel block of the pixel blocks based on the pixel data for the pixels of the pixel block during a time period, and generate a plurality of average block data by respectively averaging the individual block data for the pixel blocks; an average current calculating unit configured to receive a plurality of individual measured current values for the time period for each of the pixel blocks from corresponding ones of the current measuring units, and generate a plurality of average measured current values by respectively averaging the individual measured current values for the pixel blocks; and an overcurrent determining unit configured to receive the average measured current values from the average current calculating unit, receive the average block data from the block data calculating unit, generate a plurality of average ratios of the average measured current values to corresponding ones of the average block data, and determine whether the overcurrent occurs by comparing each of the average ratios with a threshold value.

The power supply lines may include a corresponding plurality of high power supply lines and a corresponding plurality of low power supply lines. The current measuring units may be further configured to respectively measure the currents respectively supplied to the pixel blocks through the high power supply lines.

The power supply lines may include a corresponding plurality of high power supply lines and a corresponding plurality of low power supply lines. The current measuring units may be further configured to respectively measure the currents respectively supplied to the pixel blocks through the low power supply lines.

The power supply lines may include a corresponding plurality of high power supply lines and a corresponding plurality of low power supply lines. The currents may include a corresponding plurality of high power currents and a corresponding plurality of low power currents. The current measuring units may be further configured to respectively measure the high power currents respectively supplied to the pixel blocks through the high power supply lines and to respectively measure the low power currents respectively supplied to the pixel blocks through the low power supply lines.

According to another embodiment of the present invention, a display device is provided. The display device includes: a display panel including a plurality of pixel blocks, each of the pixel blocks including a plurality of pixels; a power supply unit configured to supply power to the pixel blocks through a corresponding plurality of power supply lines; and a burning protection circuit. The burning protection circuit is configured to generate a plurality of block data for the pixel blocks based on pixel data for the pixels of corresponding ones of the pixels, generate a plurality of measured current values by respectively measuring a plurality of currents respectively supplied to the pixel blocks through the power supply lines, and determine whether an overcurrent occurs based on a plurality of ratios of the measured current values to corresponding ones of the block data.

The burning protection circuit may be further configured to determine that the overcurrent occurs when at least one of the ratios exceeds a threshold value.

The burning protection circuit may be further configured to control the power supply unit to cut off the power supplied to the pixel blocks when the burning protection circuit determines that the overcurrent occurs.

The display panel may include a power supply voltage line coupled to the power supply lines and corresponding to all of the pixel blocks. The burning protection circuit may include a plurality of current measuring units configured to respectively measure the currents supplied to the pixel blocks through the power supply voltage line from the power supply lines.

The display panel may include a plurality of power supply voltage lines respectively coupled to the power supply lines and respectively corresponding to the pixel blocks. The burning protection circuit may include a plurality of current measuring units configured to respectively measure the currents respectively supplied to the pixel blocks through the power supply voltage lines from the power supply lines.

According to yet another embodiment of the present invention, a method of protecting a display device from burning is provided. The display device includes a plurality of pixel blocks. Each of the pixel blocks includes a plurality of pixels. The pixel blocks are respectively supplied with power through a plurality of power supply lines. The method includes respectively generating a plurality of block data for the pixel blocks based on pixel data for the pixels of corresponding ones of the pixel blocks, generating a plurality of measured current values by respectively measuring a plurality of currents respectively supplied to the pixel blocks through the power supply lines, and determining whether an overcurrent occurs based on a plurality of ratios of the measured current values to corresponding ones of the block data.

The determining of whether the overcurrent occurs may include determining that the overcurrent occurs when at least one of the ratios exceeds a threshold value.

The method may further include cutting off the power supplied to the pixel blocks after determining that the overcurrent occurs.

BRIEF DESCRIPTION OF THE DRAWINGS

Example embodiments of the present invention may be understood in more detail from the following description taken in conjunction with the accompanying drawings in which.

DETAILED DESCRIPTION

Figure 1:
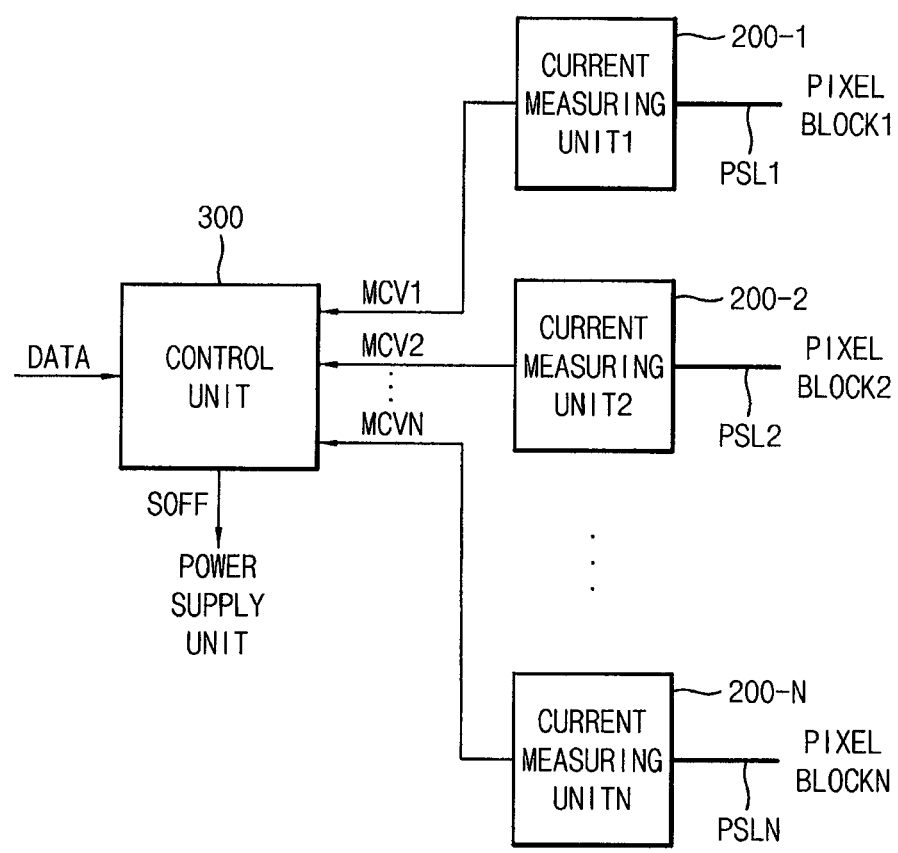
FIG. 1 is a block diagram illustrating a burning protection circuit of a display device in accordance with example embodiments.

Example embodiments of the present invention are described more fully hereinafter with reference to the accompanying drawings. Like or similar reference numerals refer to like or similar elements throughout. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

Figure 2:
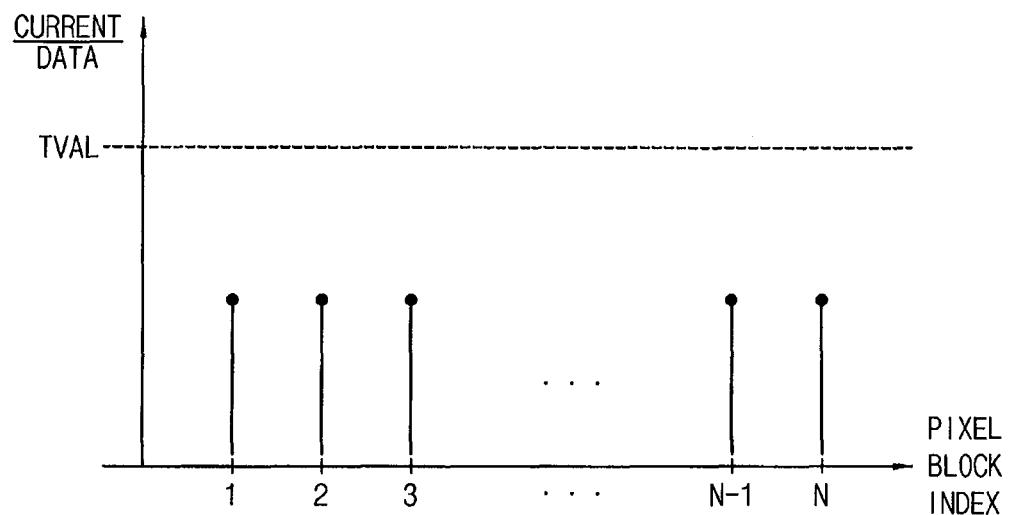
FIG. 2 is a graph illustrating ratios of measured current values to corresponding block data when an overcurrent does not occur.
Figure 3:
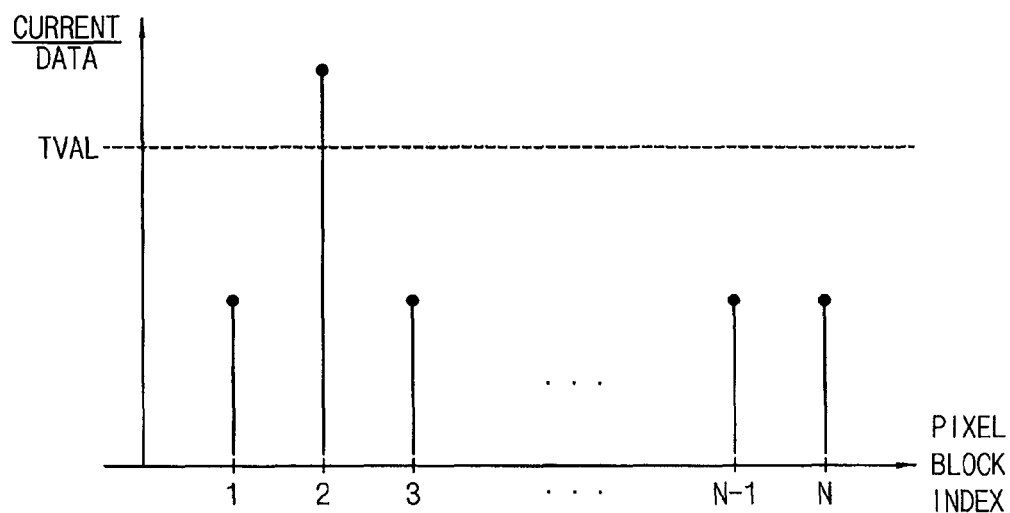
FIG. 3 is a graph illustrating ratios of measured current values to corresponding block data when an overcurrent occurs.

FIG. 1 is a block diagram illustrating a burning protection circuit 100 of a display device in accordance with example embodiments, FIG. 2 is a graph illustrating ratios of measured current values to corresponding block data when an overcurrent does not occur, and FIG. 3 is a graph illustrating ratios of measured current values to corresponding block data when an overcurrent occurs.

Referring to FIG. 1, the burning protection circuit 100 of a display device includes a plurality of current measuring units 200-1, 200-2, . . . , and 200-N respectively disposed at a plurality of power supply lines PSL1, PSL2, . . . , and PSLN, and a control unit 300 that determines whether to cut off power supply to the display device.

A plurality of pixels included in the display device may be grouped into a plurality of pixel blocks BLOCK1, BLOCK2, . . . , and BLOCKN that are respectively supplied with power through the power supply lines PSL1, PSL2, . . . , and PSLN, and the current measuring units 200-1, 200-2, . . . , and 200-N may be respectively disposed at the power supply lines PSL1, PSL2, . . . , and PSLN coupled to the pixel blocks BLOCK1, BLOCK2, . . . , and BLOCKN. In some example embodiments, the power supply lines PSL1, PSL2, . . . , and PSLN may be flexible printed circuit (FPC) lines for supplying power from an external power supply unit to a display panel.

The current measuring units 200-1, 200-2, . . . , and 200-N may generate a corresponding plurality of measured current values MCV1, MCV2, . . . , and MCVN by measuring a corresponding plurality of currents respectively supplied to the pixel blocks BLOCK1, BLOCK2, . . . , and BLOCKN through the power supply lines PSL1, PSL2, . . . , and PSLN. In some example embodiments, each of the current measuring units 200-1, 200-2, . . . , and 200-N may include a current sensing device for sensing a current flowing through a corresponding one of the power supply lines PSL1, PSL2, . . . , and PSLN.

For example, the current sensing device may include a Hall device (or Hall sensor), a sense resistor, or the like. In some example embodiments, the power supply lines PSL1, PSL2, . . . , and PSLN may be high power supply lines, and the current measuring units 200-1, 200-2, . . . , and 200-N may measure a corresponding plurality of currents (high power currents) flowing from the high power supply lines to the pixel blocks BLOCK1, BLOCK2, . . . , and BLOCKN. In other example embodiments, the power supply lines PSL1, PSL2, . . . , and PSLN may be low power supply lines, and the current measuring units 200-1, 200-2, . . . , and 200-N may measure a corresponding plurality of currents (low power currents) flowing from the pixel blocks BLOCK1, BLOCK2, . . . , and BLOCKN to the low power supply lines. In still other example embodiments, the current measuring units 200-1, 200-2, . . . , and 200-N may be disposed at high power supply lines and low power supply lines.

The control unit 300 may receive pixel data DATA for the pixels, and may calculate a corresponding plurality of block data for the pixel blocks BLOCK1, BLOCK2, . . . , and BLOCKN based on the pixel data DATA. In some example embodiments, each block data may be the sum of the pixel data DATA for the pixels included in the corresponding pixel block. In other example embodiments, each block data may be the average of the pixel data DATA for the pixels included in the corresponding pixel block. In still other example embodiments, each block data may be a normalized value of the sum or the average of the pixel data DATA for the pixels included in the corresponding pixel block.

The control unit 300 may further receive the measured current values MCV1, MCV2, . . . , and MCVN for the pixel blocks BLOCK1, BLOCK2, . . . , and BLOCKN from the current measuring units 200-1, 200-2, . . . , and 200-N, and may calculate a corresponding plurality of ratios of the measured current values MCV1, MCV2, . . . , and MCVN to the corresponding block data. The control unit 300 may determine whether an overcurrent occurs in the display device based on the ratios of the measured current values MCV1, MCV2, . . . , and MCVN to the corresponding block data.

For example, the control unit 300 may decide that the overcurrent does not occur if all of the ratios of the measured current values MCV1, MCV2, . . . , and MCVN to the corresponding block data are less than or equal to a set or predetermined threshold value, and may decide that the overcurrent occurs if at least one of the ratios of the measured current values MCV1, MCV2, . . . , and MCVN to the corresponding block data exceeds the set or predetermined threshold value.

Since the current supplied to each pixel may be proportional (e.g., substantially linearly proportional) to the corresponding pixel data DATA for the pixel, the current supplied to each pixel block may be proportional (e.g., substantially linearly proportional) to the corresponding block data for the pixel block. For example, as illustrated in FIG. 2, when a crack has not occurred in the display panel, or a line (such as a power supply voltage line) has not been shorted, the respective ratios of the measured current values MCV1, MCV2, . . . , and MCVN to the corresponding block data may be substantially the same as each other, and may be less than the set or predetermined threshold value.

However, if a crack occurs in the display panel, or if the power supply voltage line is shorted, the current supplied to the pixel block where the crack occurs may be drastically increased. For example, as illustrated in FIG. 3, if a crack occurs in a second pixel block, the ratio of the measured current value MCV2 of the second pixel block to the corresponding block data of the second pixel block may be greater than the ratios of other pixel blocks, and may exceed the set or predetermined threshold value TVAL.

If at least one of the ratios of the measured current values MCV1, MCV2, . . . , and MCVN to the corresponding block data exceeds the set or predetermined threshold value TVAL, the control unit 300 may decide that, for example, a crack in the display device or a short in the power supply voltage line has occurred, and may cut off the power supplied to the pixel blocks BLOCK1, BLOCK2, . . . , and BLOCKN or the display device. For example, the control unit 300 may control a power supply unit to cut off the power supply to the display device by applying a power-off signal SOFF to the power supply unit.

In some example embodiments, the control unit 300 may calculate the block data corresponding to one frame, and may determine whether the overcurrent occurs based on the ratios of the measured current values MCV1, MCV2, ..., and MCVN to the corresponding block data corresponding to one frame. In other example embodiments, the control unit 300 may generate a plurality of average block data by respectively averaging pluralities of individual block data for the pixel blocks BLOCK1, BLOCK2, ..., and BLOCKN corresponding to two or more frames, may generate a plurality of average measured current values by respectively averaging pluralities of individual measured current values from the current measuring units 200-1, 200-2, ..., and 200-N during the two or more frames, and may determine that the overcurrent occurs based on a plurality of average ratios of the average measured current values to the corresponding average block data.

In some example embodiments, the control unit 300 may be implemented with a microcontroller, a field programmable gate array (FPGA), an application specific integrated circuit (ASIC), or the like. In other example embodiments, at least a portion of the control unit 300 may be included in a timing controller of the display device.

A comparable burning protection circuit may determine whether an overcurrent occurs by measuring a current supplied to a display panel during a non-emission period of the display device. Thus, when a display device is driven without a non-emission period, for example when the display device is driven with a progressive emission digital driving method, the comparable burning protection circuit cannot detect the overcurrent.

However, as described above, the burning protection circuit 100 of the display device according to example embodiments may determine whether the overcurrent occurs based on the ratios of the measured current values MCV1, MCV2, ..., and MCVN to the corresponding block data. Thus, even if the display device is driven without a non-emission period, or for example even if the display device is driven with a progressive emission with simultaneous scan (PESS) method, the burning protection circuit 100 according to example embodiments may detect the overcurrent and may protect the display device from burning.

Figure 4:
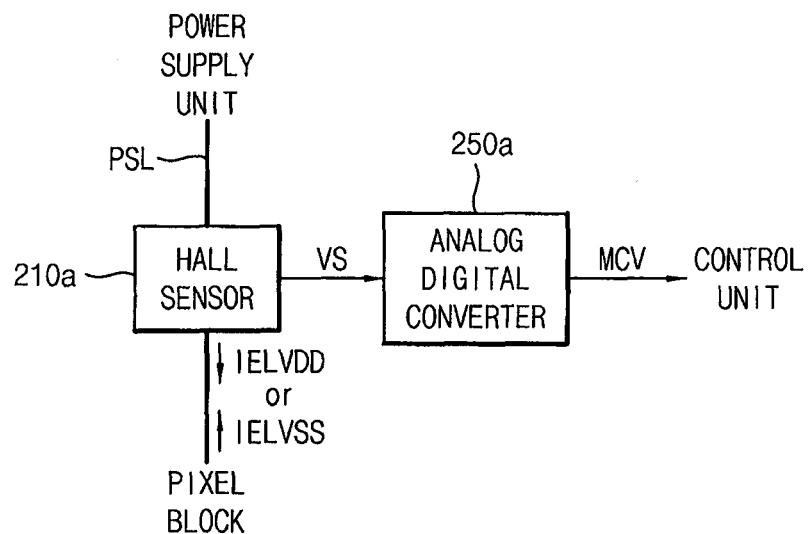
FIG. 4 is a diagram illustrating an example current measuring unit included in a burning protection circuit in accordance with example embodiments.

FIG. 4 is a diagram illustrating an example current measuring unit 200a included in a burning protection circuit in accordance with example embodiments.

Referring to FIG. 4, the current measuring unit 200a may include a Hall device 210a (such as a Hall sensor) as a current sensing device that senses a current flowing through a power supply line PSL, and a converter 250a. The Hall device 210a may generate a sense voltage VS corresponding to an intensity of a magnetic field generated by a current flowing through the power supply line PSL. In some example embodiments, the power supply line PSL may be a high power supply line, and the Hall device 210a may generate the sense voltage VS corresponding to a current IELVDD flowing from the high power supply line to a pixel block. In other example embodiments, the power supply line PSL may be a low power supply line, and the Hall device 210a may generate the sense voltage VS corresponding to a current IELVSS flowing from the pixel block to the low power supply line.

The converter 250a may convert the sense voltage VS generated by the Hall device 210a into a measured current value MCV, and may provide the measured current value MCV to a control unit. Thus, the control unit may receive the measured current value MCV that is a measured value of the current IELVDD flowing from the high power supply line to the pixel block or of the current IELVSS flowing from the pixel block to the low power supply line.

In some example embodiments, the converter 250a may be an analog-to-digital converter 250a that converts the analog sense voltage VS output from the Hall device 210a into a digital measured current value MCV. The analog-to-digital converter 250a may be included in the current measuring unit 200a, or may be shared by two or more current measuring units 200a. In other example embodiments, the converter 250a may be implemented with a microcontroller, a voltage-to-frequency (VF) converter, or the like. In some example embodiments, the converter 250a may be located inside the control unit.

The current measuring unit 200a may generate the measured current value MCV by sampling the current supplied to the pixel block at least once during a set or predetermined time period. For example, the measured current value MCV may be a sampled value generated by sampling the current once during the set or predetermined time period, or may be the sum or the average of sampled values (e.g., a plurality of individual measured current values) generated by sampling the current two or more times (e.g., a plurality of individual currents) during the set or predetermined time period.

In some example embodiments, the current measuring unit 200a may further include an amplifier between the Hall device 210a and the converter 250a. The amplifier amplifies the sense voltage VS generated by the Hall device 210a.

Figure 5:
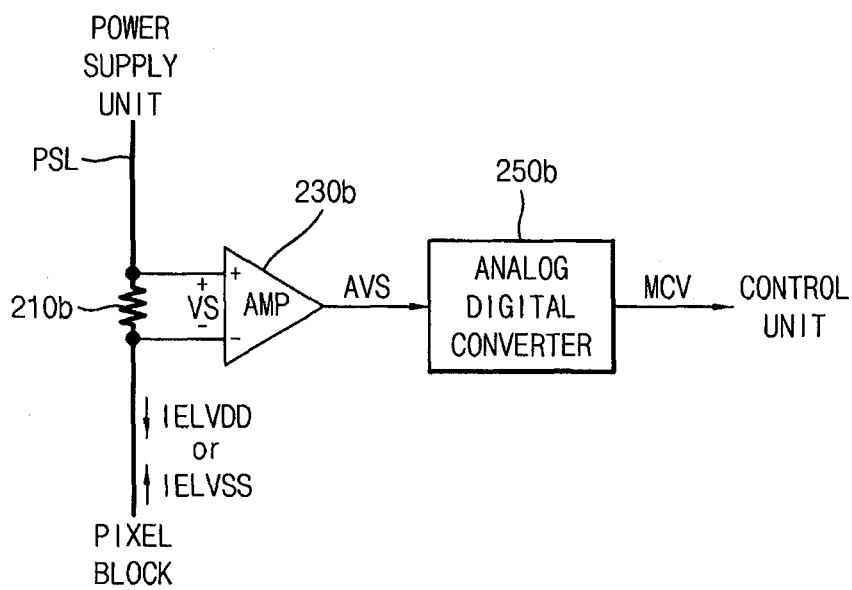
FIG. 5 is a diagram illustrating another example current measuring unit included in a burning protection circuit in accordance with example embodiments.

FIG. 5 is a diagram illustrating another example current measuring unit 200b included in a burning protection circuit in accordance with example embodiments.

Referring to FIG. 5, the current measuring unit 200b may include a sense resistor 210b as a current sensing device that senses a current flowing through a power supply line PSL, an amplifier 230b, and a converter 250b.

The sense resistor 210b may be disposed at the power supply line PSL, and may generate a sense voltage VS corresponding to a current flowing through the power supply line PSL. The sense resistor 210b may have a low resistance such that a voltage or a current supplied to a pixel block through the power supply line PSL may not be substantially affected by the sense resistor 210b. In some example embodiments, the power supply line PSL may be a high power supply line, and the sense resistor 210b may generate the sense voltage VS corresponding to a current IELVDD flowing from the high power supply line to the pixel block. In other example embodiments, the power supply line PSL may be a low power supply line, and the sense resistor 210b may generate the sense voltage VS corresponding to a current IELVSS flowing from the pixel block to the low power supply line.

The amplifier 230b may generate an amplified sense voltage AVS by amplifying the sense voltage VS generated by the sense resistor 210b. In some example embodiments, the amplifier 230b may be a differential amplifier as illustrated in FIG. 5. In other example embodiments, the amplifier 230b may be a single ended amplifier. Although FIG. 5 illustrates an example where the current measuring unit 200b includes the amplifier 230b, in some example embodiments, each current measuring unit 200b may be implemented without the amplifier 230b.

The converter 250b may convert the amplified sense voltage AVS output from the amplifier 230b into a measured current value MCV, and may provide the measured current value MCV to a control unit. Thus, the control unit may receive the measured current value MCV that is a measured value of the current IELVDD flowing from the high power supply line to the pixel block or the current IELVSS flowing from the pixel block to the low power supply line.

In some example embodiments, the converter 250b may be an analog-to-digital converter 250b that converts the analog amplified sense voltage AVS output from the amplifier 230b into a digital measured current value MCV. The analog-to-digital converter 250b may be included in the current measuring unit 200b, or may be shared by two or more current measuring units 200b. In other example embodiments, the converter 250b may be implemented with a microcontroller, a voltage-to-frequency (VF) converter, or the like. In some example embodiments, the converter 250b may be located inside the control unit.

The current measuring unit 200b may generate the measured current value MCV by sampling the current supplied to the pixel block at least once during a set or predetermined time period. For example, the measured current value MCV may be a sampled value generated by sampling the current once during the set or predetermined time period, or may be the sum or the average of sampled values (e.g., a plurality of individual measured current values) generated by sampling the current two or more times (e.g., a plurality of individual currents) during the set or predetermined time period.

Figure 6:
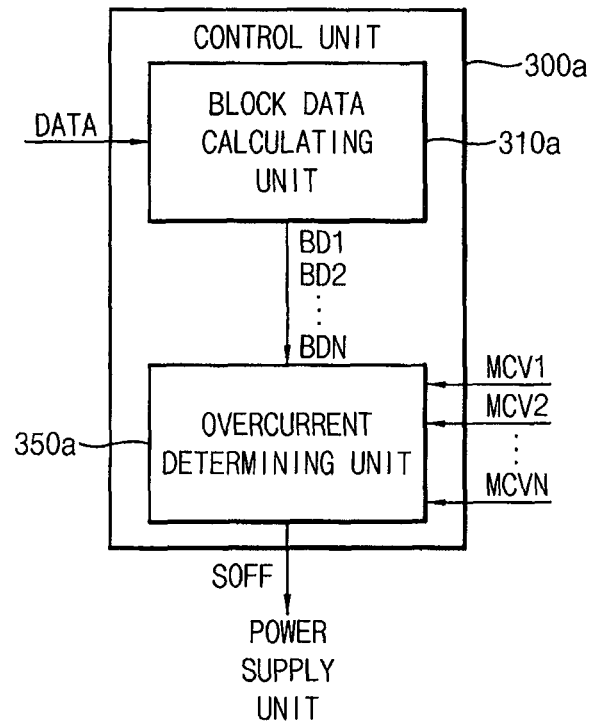
FIG. 6 is a diagram illustrating an example control unit included in a burning protection circuit in accordance with example embodiments.

FIG. 6 is a diagram illustrating an example control unit 300a included in a burning protection circuit in accordance with example embodiments.

Referring to FIG. 6, the control unit 300a of a burning protection circuit may include a block data calculating unit 310a and an overcurrent determining unit 350a.

The block data calculating unit 310a may receive pixel data DATA for a plurality of pixels included in a display device from a host device, and may generate (e.g., calculate) a plurality of block data BD1, BD2, ..., and BDN for a corresponding plurality of pixel blocks BLOCK1, BLOCK2, ..., and BLOCKN based on the pixel data DATA for the pixels. In some example embodiments, each of the block data BD1, BD2, ..., and BDN may be the sum of the pixel data DATA for the pixels included in a corresponding one of the pixel blocks BLOCK1, BLOCK2, ..., and BLOCKN. In other example embodiments, each of the block data BD1, BD2, ..., and BDN may be the average of the pixel data DATA for the pixels included in the corresponding one of the pixel blocks BLOCK1, BLOCK2, ..., and BLOCKN. In still other example embodiments, each of the block data BD1, BD2, ..., and BDN may be a normalized value of the sum or the average of the pixel data DATA for the pixels included in the corresponding one of the pixel blocks BLOCK1, BLOCK2, ..., and BLOCKN.

The overcurrent determining unit 350a may respectively receive a plurality of measured current values MCV1, MCV2, ..., and MCVN for the pixel blocks BLOCK1, BLOCK2, ..., and BLOCKN from a corresponding plurality of current measuring units. The measured current values MCV1, MCV2, ..., and MCVN may be measured values of a plurality of currents respectively supplied to the pixel blocks BLOCK1, BLOCK2, ..., and BLOCKN. Each of the measured current values MCV1, MCV2, ..., and MCVN may be generated by sampling a current supplied to a corresponding one of the pixel blocks BLOCK1, BLOCK2, ..., and BLOCKN at least once during a set or predetermined time period. In some example embodiments, the set or predetermined time period may correspond to at least one frame.

The overcurrent determining unit 350a may further receive the block data BD1, BD2, ..., and BDN for the corresponding plurality of pixel blocks BLOCK1, BLOCK2, ..., and BLOCKN from the block data calculating unit 310a, and may calculate a plurality of ratios of the measured current values MCV1, MCV2, ..., and MCVN to the corresponding block data BD1, BD2, ..., and BDN. Since a current supplied to each pixel may be proportional (e.g., substantially linearly proportional) to a corresponding pixel data DATA for the pixel, a current supplied to each pixel block may be proportional (e.g., substantially linearly proportional) to a corresponding block data for the pixel block. Thus, when a crack has not occurred in the display panel, or a line (such as a power supply voltage line) has not been shorted, the respective ratios of the measured current values MCV1, MCV2, ..., and MCVN to the corresponding block data BD1, BD2, ..., and BDN may be substantially the same as each other.

The overcurrent determining unit 350a may determine whether an overcurrent occurs by comparing the ratios of the measured current values MCV1, MCV2, ..., and MCVN to the corresponding block data BD1, BD2, ..., and BDN with a set or predetermined threshold value. For example, the overcurrent determining unit 350a may decide that the overcurrent does not occur if all of the ratios of the measured current values MCV1, MCV2, ..., and MCVN to the corresponding block data BD1, BD2, ..., and BDN are less than or equal to the set or predetermined threshold value, and may decide that the overcurrent occurs if at least one of the ratios of the measured current values MCV1, MCV2, ..., and MCVN to the corresponding block data BD1, BD2, ..., and BDN exceeds the set or predetermined threshold value. When it is decided that the overcurrent occurs, the overcurrent determining unit 350a may apply a power-off signal SOFF to a power supply unit to cut off the power supply to the display device.

In some example embodiments, while the display device operates, the burning protection circuit including the control unit 300a may perform the overcurrent determination operation continuously (for example, at each and every frame) or non-continuously (for example, once during a set or predetermined number of frames)

In some example embodiments, the control unit 300a may be implemented with a microcontroller, a field programmable gate array (FPGA), an application specific integrated circuit (ASIC), or the like. In other example embodiments, at least a portion of the control unit 300a may be included in a timing controller of the display device. For example, the block data calculating unit 310a may be implemented inside the timing controller.

As described above, the burning protection circuit including the control unit 300a according to example embodiments may determine whether the overcurrent occurs based on the ratios of the measured current values MCV1, MCV2, ..., and MCVN to the corresponding block data BD1, BD2, ..., and BDN, and thus may accurately detect the overcurrent even if the display device is driven without a non-emission period.

Figure 7:
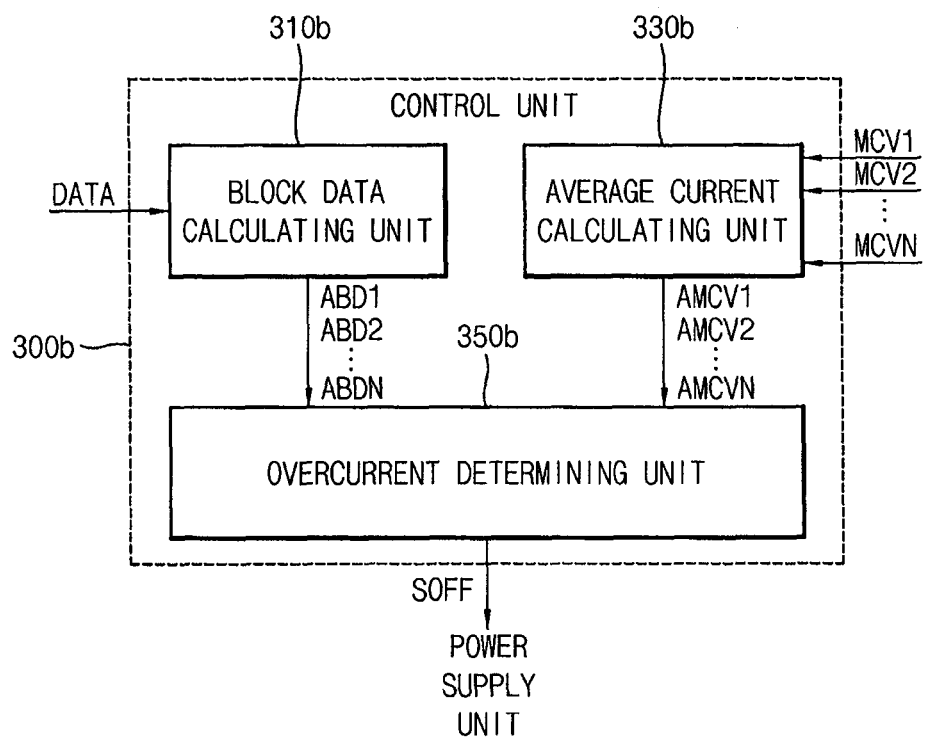
FIG. 7 is a diagram illustrating another example control unit included in a burning protection circuit in accordance with example embodiments.

FIG. 7 is a diagram illustrating another example control unit 300b included in a burning protection circuit in accordance with example embodiments.

Referring to FIG. 7, the control unit 300b of a burning protection circuit may include a block data calculating unit 310b, an average current calculating unit 330b, and an overcurrent determining unit 350b. The block data calculating unit 310b may receive pixel data DATA for a plurality of pixels included in a display device from a host device, and may calculate a plurality of block data for a corresponding plurality of pixel blocks BLOCK1, BLOCK2, ..., and BLOCKN based on the pixel data DATA for the pixels. The block data calculating unit 310b may calculate the block data at each frame during a set or predetermined time period.

In some example embodiments, the block data calculating unit 310b may generate a plurality of average block data ABD1, ABD2, . . . , and ABDN by respectively averaging a plurality of individual block data for each of the pixel blocks BLOCK1, BLOCK2, . . . , and BLOCKN during the set or predetermined time period, and may provide the average block data ABD1, ABD2, . . . , and ABDN to the overcurrent determining unit 350b. According to example embodiments, the set or predetermined time period may correspond to one frame, or may correspond to two or more frames.

In other example embodiments, the block data calculating unit 310b may respectively accumulate the individual block data for each of the pixel blocks BLOCK1, BLOCK2, . . . , and BLOCKN during the set or predetermined time period, and may provide the overcurrent determining unit 350b with the accumulated block data or average or normalized values of the accumulated block data.

The average current calculating unit 330b may receive a plurality of measured current values MCV1, MCV2, . . . , and MCVN for the corresponding pixel blocks BLOCK1, BLOCK2, . . . and BLOCKN from a corresponding plurality of current measuring units during the set or predetermined time period. In some example embodiments, the average current calculating unit 330b may generate a plurality of average measured current values AMCV1, AMCV2, . . . , and AMCVN by respectively averaging a plurality of individual measured current values for each of the pixel blocks BLOCK1, BLOCK2, . . . , and BLOCKN during the set or predetermined time period. According to example embodiments, the set or predetermined time period may correspond to one frame, or may correspond to two or more frames.

Thus, the average measured current values AMCV1, AMCV2, . . . , and AMCVN may be average values of the corresponding pluralities of individual measured current values that are sampled during one frame, or may be average values of the corresponding pluralities of individual measured current values that are sampled during two or more frames. In other example embodiments, the average current calculating unit 330b may respectively accumulate the individual measured current values for each of the pixel blocks BLOCK1, BLOCK2, . . . , and BLOCKN during the set or predetermined time period, and may provide the overcurrent determining unit 350b with the accumulated measured current values or average or normalized values of the measured current values.

The overcurrent determining unit 350b may receive the average block data ABD1, ABD2, . . . , and ABDN from the block data calculating unit 310b, may receive the average measured current values AMCV1, AMCV2, . . . , and AMCVN from the average current calculating unit 330b, and may calculate a corresponding plurality of ratios (or average ratios) of the average measured current values AMCV1, AMCV2, . . . , and AMCVN to the corresponding average block data ABD1, ABD2, . . . , and ABDN. In other example embodiments, the overcurrent determining unit 350b may receive the accumulated block data from the block data calculating unit 310b, may receive the accumulated measured current values from the average current calculating unit 330b, and may calculate a corresponding plurality of ratios of the accumulated measured current values to the corresponding accumulated block data.

The overcurrent determining unit 350b may determine whether an overcurrent occurs by comparing the average ratios of the average measured current values AMCV1, AMCV2, . . . , and AMCVN to the corresponding average block data ABD1, ABD2, . . . , and ABDN with a set or predetermined threshold value.

For example, the overcurrent determining unit 350b may decide that the overcurrent does not occur if all of the average ratios of the average measured current values AMCV1, AMCV2, . . . , and AMCVN to the corresponding average block data ABD1, ABD2, . . . , and ABDN are less than or equal to the set or predetermined threshold value, and may decide that the overcurrent occurs if at least one of the average ratios of the average measured current values AMCV1, AMCV2, . . . , and AMCVN to the corresponding average block data ABD1, ABD2, . . . , and ABDN exceeds the set or predetermined threshold value. When it is decided that the overcurrent occurs, the overcurrent determining unit 350b may apply a power-off signal SOFF to a power supply unit to cut off power supply to the display device.

As described above, the burning protection circuit including the control unit 300b according to example embodiments may determine whether the overcurrent occurs based on the average ratios of the average measured current values AMCV1, AMCV2, . . . , and AMCVN to the corresponding average block data ABD1, ABD2, . . . , and ABDN, and thus may accurately detect the overcurrent even if the display device is driven without the non-emission period.

Further, the burning protection circuit including the control unit 300b according to example embodiments may use the average measured current values AMCV1, AMCV2, . . . , and AMCVN that are average values of the corresponding pluralities of individual measured current values during two or more frames, and the corresponding average block data ABD1, ABD2, . . . , and ABDN that are average values of the corresponding pluralities of individual block data during two or more frames to determine whether the overcurrent occurs, and thus may more accurately detect the overcurrent.

Figure 8:
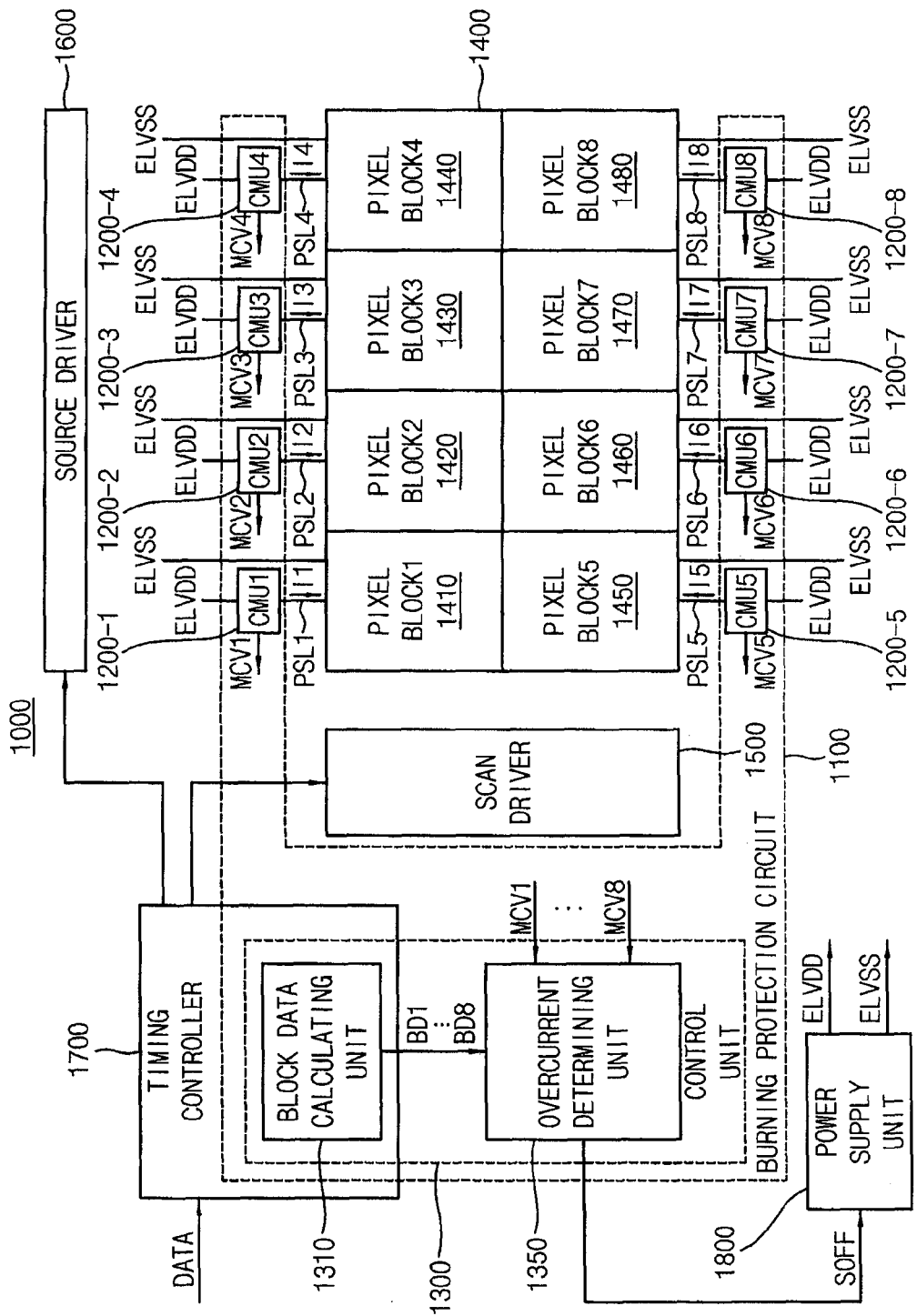
FIG. 8 is a block diagram illustrating a display device in accordance with example embodiments.

FIG. 8 is a block diagram illustrating a display device 1000 in accordance with example embodiments.

Referring to FIG. 8, the display device 1000 includes a display panel 1400 including a plurality of pixel blocks 1410, 1420, 1430, 1440, 1450, 1460, 1470, and 1480, a power supply unit 1800, and a burning protection circuit 1100. In some example embodiments, the display device 1000 may further include a scan driver 1500, a source driver 1600, a timing controller 1700, or the like.

The display panel 1400 may include a plurality of pixels that are arranged in a matrix having a plurality of rows and a plurality of columns. The pixels may be grouped into the pixel blocks 1410, 1420, 1430, 1440, 1450, 1460, 1470, and 1480 that are respectively supplied with power through a corresponding plurality of high power supply lines PSL1, PSL2, PSL3, PSL4, PSL5, PSL6, PSL7, and PSL8, and a plurality (e.g., a corresponding plurality) of low power supply lines (see, e.g., the power lines connecting low power source voltage ELVSS to each of the pixel blocks 1410, 1420, 1430, 1440, 1450, 1460, 1470, and 1480 in FIG. 8).

In some example embodiments, the high power supply lines PSL1, PSL2, PSL3, PSL4, PSL5, PSL6, PSL7, and PSL8 and the low power supply lines may be flexible printed circuit (FPC) lines for supplying power from the power supply unit 1800 to the display panel 1400. In some example embodiments, the display panel 1400 may be an organic light emitting display (OLED) panel. In other example embodiments, the display panel 1400 may be a liquid crystal display (LCD) panel, a plasma display panel (PDP), or the like.

The scan driver 1500 and the source driver 1600 may be controlled by the timing controller 1700 to drive the display panel 1400. For example, the scan driver 1500 may turn on or off thin film transistors (TFTs) formed in the display panel

1400. The source driver 1600 may apply data voltages to the pixels based on data provided from the timing controller 1700.

The timing controller 1700 may receive pixel data DATA for the pixels and control signals from a host device. For example, the control signals may include a vertical synchronization signal (VSYNC), a horizontal synchronization signal (HSYNC), a clock signal (CLK), and a data enable signal (DE). Based on the pixel data DATA and the control signals, the timing controller 1700 may generate the data provided to the source driver 1600 and control signals provided to the scan driver 1500 and the source driver 1600.

The power supply unit 1800 may respectively supply power to the pixel blocks 1410, 1420, 1430, 1440, 1450, 1460, 1470, and 1480 through the high power supply lines PSL1, PSL2, PSL3, PSL4, PSL5, PSL6, PSL7, and PSL8 and the low power supply lines. For example, the power supply unit 1800 may provide a high power supply voltage ELVDD to the pixel blocks 1410, 1420, 1430, 1440, 1450, 1460, 1470, and 1480 through the high power supply lines PSL1, PSL2, PSL3, PSL4, PSL5, PSL6, PSL7, and PSL8, respectively, and may provide a low power supply voltage ELVSS to the pixel blocks 1410, 1420, 1430, 1440, 1450, 1460, 1470, and 1480 through the low power supply lines, respectively.

The burning protection circuit 1100 may detect an overcurrent (or an occurrence of the overcurrent), and may cut off the power supplied to the pixel blocks 1410, 1420, 1430, 1440, 1450, 1460, 1470, and 1480 when the overcurrent (or the occurrence of the overcurrent) is detected. The burning protection circuit 1100 may include a plurality of current measuring units 12001, 1200-2, 1200-3, 1200-4, 1200-5, 1200-6, 1200-7, and 1200-8 (also respectively labeled CMU1, CMU2, CMU3, CMU4, CMU5, CMU6, CMU7, and CMU8), and a control unit 1300.

The current measuring units 1200-1, 1200-2, 1200-3, 1200-4, 1200-5, 1200-6, 1200-7, and 1200-8 may generate a plurality of measured current values MCV1, MCV2, MCV3, MCV4, MCV5, MCV6, MCV7, and MCV8 by measuring a corresponding plurality of currents I1, I2, I3, I4, I5, I6, I7, and I8 supplied to the corresponding pixel blocks 1410, 1420, 1430, 1440, 1450, 1460, 1470, and 1480. In some example embodiments, the current measuring units 1200-1, 1200-2, 1200-3, 1200-4, 1200-5, 1200-6, 1200-7, and 1200-8 may be respectively disposed at the high power supply lines PSL1, PSL2, PSL3, PSL4, PSL5, PSL6, PSL7, and PSL8, and the currents I1, I2, I3, I4, I5, I6, I7, and I8 respectively flowing from the high power supply lines PSL1, PSL2, PSL3, PSL4, PSL5, PSL6, PSL7, and PSL8 to the pixel blocks 1410, 1420, 1430, 1440, 1450, 1460, 1470, and 1480 may be measured.

The control unit 1300 may determine whether the overcurrent occurs based on the pixel data DATA for the pixels and the measured current values MCV1, MCV2, MCV3, MCV4, MCV5, MCV6, MCV7, and MCV8. In some example embodiments, the control unit 1300 may include a block data calculating unit 1310 that respectively calculates a plurality of block data BD1, BD2, . . . , BD8 for the corresponding pixel blocks 1410, 1420, 1430, 1440, 1450, 1460, 1470, and 1480 based on the pixel data DATA. In some example embodiments, the block data calculating unit 1310 may be located inside the control unit 1300. In other example embodiments, the block data calculating unit 1310 may be located outside the control unit 1300.

The control unit 1300 may further include an overcurrent determining unit 1350 that receives the block data BD1, BD2, . . . , BD8 from the block data calculating unit 1310, receives the measured current values MCV1, MCV2, MCV3, MCV4, MCV5, MCV6, MCV7, and MCV8 from the current measuring units 1200-1, 1200-2, 1200-3, 1200-4, 1200-5, 1200-6, 1200-7, and 1200-8, and calculates a plurality of ratios of the measured current values MCV1, MCV2, MCV3, MCV4, MCV5, MCV6, MCV7, and MCV8 to the corresponding block data BD1, BD2, . . . , BD8. The overcurrent determining unit 1350 may determine whether the overcurrent occurs based on the ratios of the measured current values MCV1, MCV2, MCV3, MCV4, MCV5, MCV6, MCV7, and MCV8 to the corresponding block data BD1, BD2, . . . , BD8.

In some example embodiments, the overcurrent determining unit 1350 may decide that the overcurrent occurs if at least one of the ratios of the measured current values MCV1, MCV2, MCV3, MCV4, MCV5, MCV6, MCV7, and MCV8 to the corresponding block data BD1, BD2, . . . , BD8 exceeds a set or predetermined threshold value. When it is decided that the overcurrent occurs, the overcurrent determining unit 1350 may apply a power-off signal SOFF to the power supply unit 1800 to cut off the power supply to the display device 1000. Accordingly, a burn or a fire may be prevented in the display device 1000 even if a crack occurs in the display panel 1400, or a line (e.g., a power supply line) is abnormally shorted.

As described above, the display device 1000 according to example embodiments may determine whether the overcurrent occurs based on the ratios of the measured current values MCV1, MCV2, MCV3, MCV4, MCV5, MCV6, MCV7, and MCV8 to the corresponding block data BD1, BD2, . . . , BD8, thereby accurately detecting the overcurrent and securely protecting the display device 1000 from burning even if the display device 1000 is driven without a non-emission period (e.g., by a PESS method).

Figure 9:
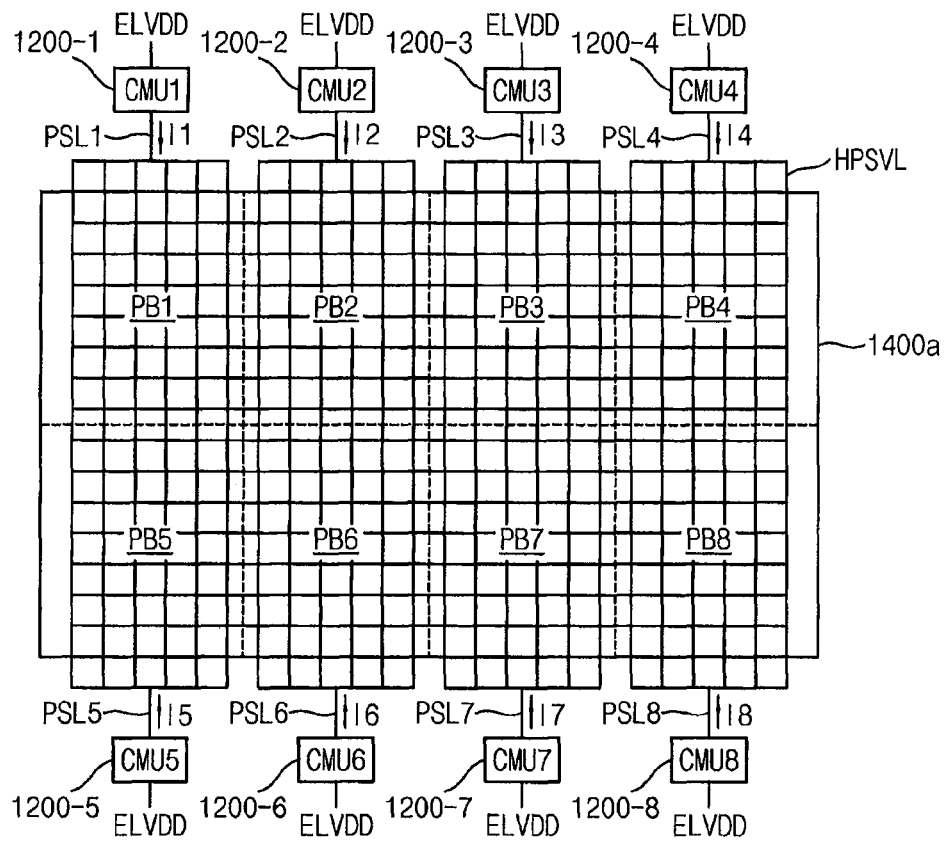
FIG. 9 is a diagram illustrating an example high power supply voltage line included in a display device in accordance with example embodiments.
Figure 10:
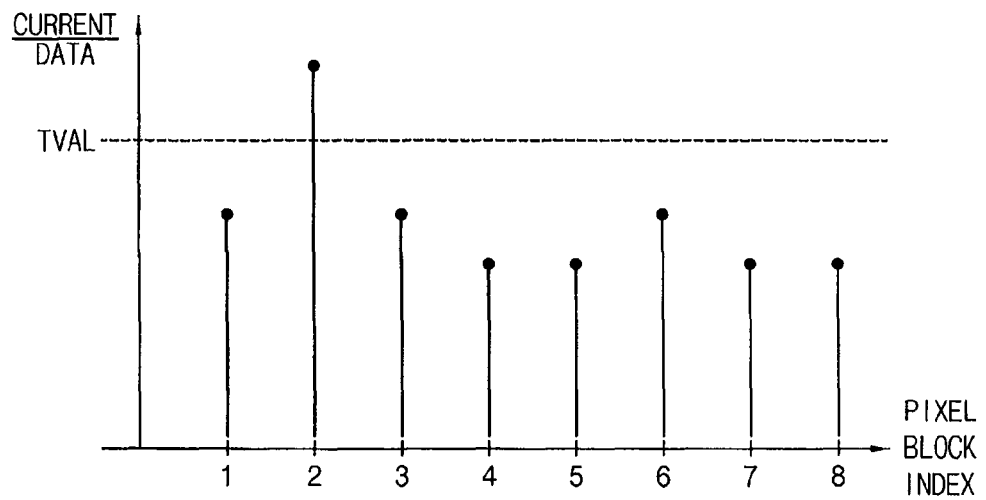
FIG. 10 is a graph illustrating ratios of measured current values to corresponding block data when an overcurrent occurs in a display device including the high power supply voltage line illustrated in FIG. 9.

FIG. 9 is a diagram illustrating an example high power supply voltage line included in a display device in accordance with example embodiments, and FIG. 10 is a graph illustrating ratios of measured current values to corresponding block data when an overcurrent occurs in a display device including the high power supply voltage line illustrated in FIG. 9.

Referring to FIG. 9, the display panel includes a display panel 1400a that may include an integrated high power supply voltage line HPSVL having a mesh structure that is shared by a plurality of pixel blocks PB1, PB2, PB3, PB4, PB5, PB6, PB7, and PB8. The high power supply voltage line HPSVL may supply respective pixels included in the pixel blocks PB1, PB2, PB3, PB4, PB5, PB6, PB7, and PB8 with a high power supply voltage ELVDD provided from a corresponding plurality of high power supply lines PSL1, PSL2, PSL3, PSL4, PSL5, PSL6, PSL7, and PSL8. In some example embodiments, the high power supply voltage line HPSVL may include a plurality of main power supply voltage lines and a plurality of sub-power supply voltage lines. The main power supply voltage lines and the sub-power supply voltage lines may be coupled to each other via a plurality of contacts, or may be integrally formed.

The high power supply voltage line HPSVL may be coupled to the high power supply lines PSL1, PSL2, PSL3, PSL4, PSL5, PSL6, PSL7, and PSL8, and may receive the high power supply voltage ELVDD through the high power supply lines PSL1, PSL2, PSL3, PSL4, PSL5, PSL6, PSL7, and PSL8. The high power supply voltage line HPSVL may be further coupled to all pixels included in the display panel 1400a, and may provide the high power supply voltage ELVDD to all the pixels included in the display panel 1400a. That is, the high power supply voltage line HPSVL may be a single or integrated power supply voltage line corresponding to all the pixel blocks PB1, PB2, PB3, PB4, PB5, PB6, PB7, and PB8.

A plurality of current measuring units 1200-1, 1200-2, 1200-3, 1200-4, 1200-5, 1200-6, 1200-7, and 1200-8 (also respectively labeled CMU1, CMU2, CMU3, CMU4, CMU5, CMU6, CMU7, and CMU8), and a control unit 1300 may be respectively disposed at the high power supply lines PSL1, PSL2, PSL3, PSL4, PSL5, PSL6, PSL7, and PSL8, and may measure a corresponding plurality of currents I1, I2, I3, I4, I5, I6, I7, and I8 supplied from the high power supply lines PSL1, PSL2, PSL3, PSL4, PSL5, PSL6, PSL7, and PSL8 to the single high power supply voltage line HPSVL.

When a crack occurs in one of the pixel blocks PB1, PB2, PB3, PB4, PB5, PB6, PB7, and PB8, the currents I1, I2, I3, I4, I5, I6, I7, and I8 supplied from the corresponding high power supply lines PSL1, PSL2, PSL3, PSL4, PSL5, PSL6, PSL7, and PSL8 to the single high power supply voltage line HPSVL may be increased, and, in particular, the current supplied from the high power supply line corresponding to the pixel block having the crack may be greatly increased. For example, when a crack occurs in the second pixel block PB2, the current I2 supplied through the high power supply line PSL2 corresponding to the second pixel block PB2 may be greatly increased as illustrated in FIG. 10. In this case, a ratio of a measured value of the current I2 to block data for the second pixel block PB2 may be higher than a set or predetermined threshold value TVAL, and a burning protection circuit according to example embodiments may cut off power supply to a corresponding display device.

Figure 11:
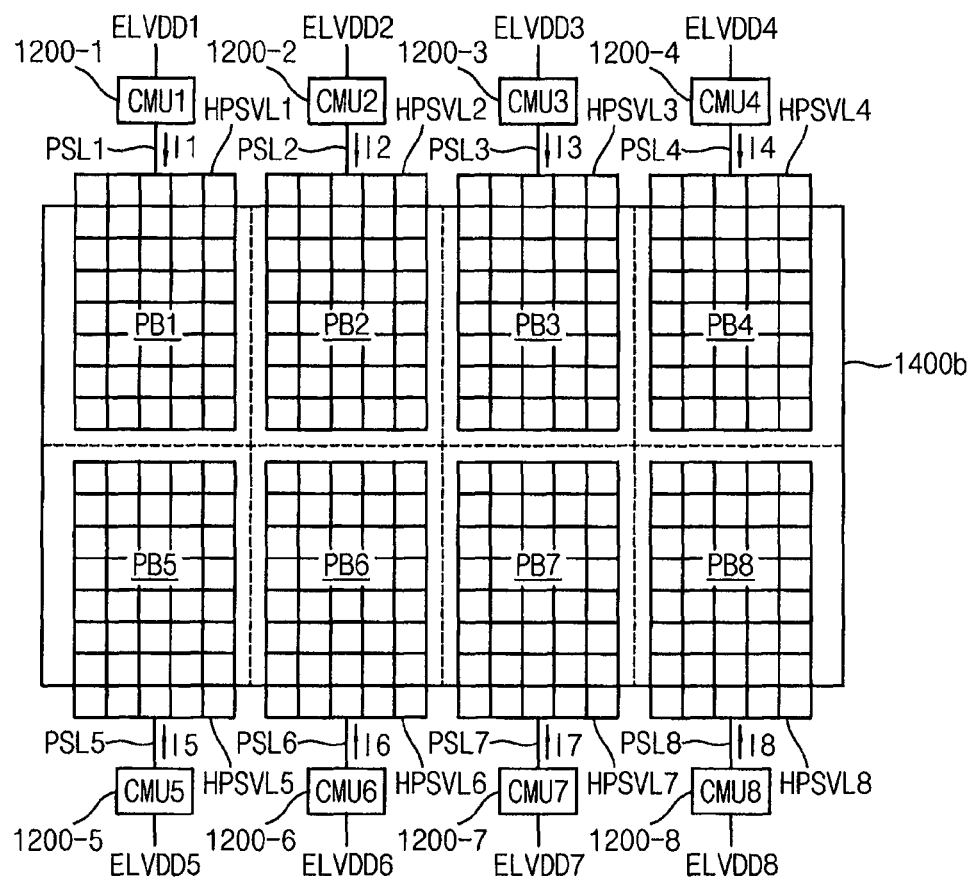
FIG. 11 is a diagram illustrating another example high power supply voltage line included in a display device in accordance with example embodiments.
Figure 12:
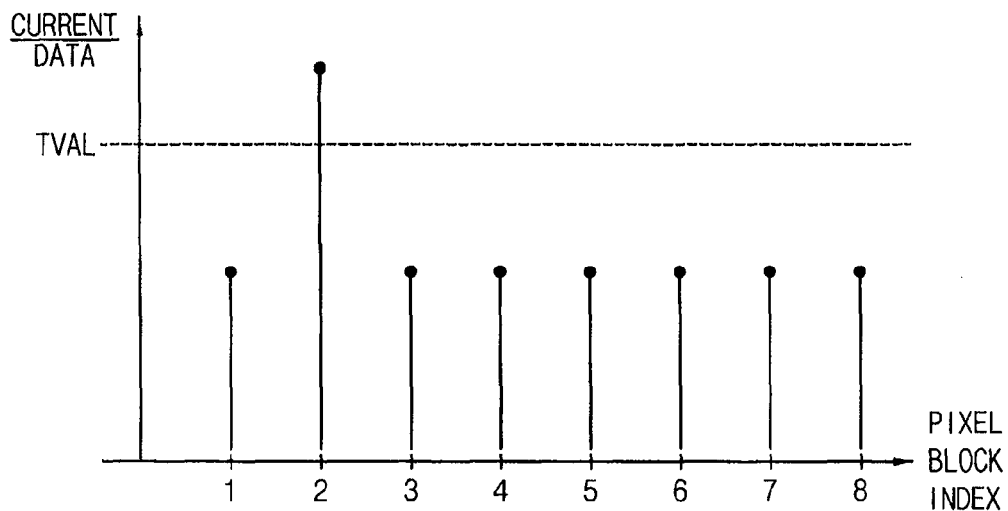
FIG. 12 is a graph illustrating ratios of measured current values to corresponding block data when an overcurrent occurs in a display device including the high power supply voltage line illustrated in FIG. 11.

FIG. 11 is a diagram illustrating another example high power supply voltage line included in a display device in accordance with example embodiments, and FIG. 12 is a graph illustrating ratios of measured current values to corresponding block data when an overcurrent occurs in a display device including the high power supply voltage line illustrated in FIG. 11.

Referring to FIG. 11, a display panel 1400b may include a plurality of high power supply voltage lines HPSVL1, HPSVL2, HPSVL3, HPSVL4, HPSVL5, HPSVL6, HPSVL7, and HPSVL8 that supply a corresponding plurality of pixel blocks PB1, PB2, PB3, PB4, PB5, PB6, PB7, and PB8 with a corresponding plurality of high power supply voltages ELVDD1, ELVDD2, ELVDD3, ELVDD4, ELVDD5, ELVDD6, ELVDD7, and ELVDD8 through a corresponding plurality of high power supply lines PSL1, PSL2, PSL3, PSL4, PSL5, PSL6, PSL7, and PSL8.

In some example embodiments, each of the high power supply voltage lines HPSVL1, HPSVL2, HPSVL3, HPSVL4, HPSVL5, HPSVL6, HPSVL7, and HPSVL8 may include a plurality of main power supply voltage lines and a plurality of sub-power supply voltage lines. The main power supply voltage lines and the sub-power supply voltage lines may be coupled to each other via a plurality of contacts, or may be integrally formed.

The high power supply voltage lines HPSVL1, HPSVL2, HPSVL3, HPSVL4, HPSVL5, HPSVL6, HPSVL7, and HPSVL8 may be respectively coupled to the high power supply lines PSL1, PSL2, PSL3, PSL4, PSL5, PSL6, PSL7, and PSL8, and may respectively receive the high power supply voltages ELVDD1, ELVDD2, ELVDD3, ELVDD4, ELVDD5, ELVDD6, ELVDD7, and ELVDD8 through the high power supply lines PSL1, PSL2, PSL3, PSL4, PSL5, PSL6, PSL7, and PSL8. The high power supply voltages ELVDD1, ELVDD2, ELVDD3, ELVDD4, ELVDD5, ELVDD6, ELVDD7, and ELVDD8 may have substantially the same voltage level.

Each of the high power supply voltage lines HPSVL1, HPSVL2, HPSVL3, HPSVL4, HPSVL5, HPSVL6, HPSVL7, and HPSVL8 may be coupled to all pixels included in a corresponding one of the pixel blocks PB1, PB2, PB3, PB4, PB5, PB6, PB7, and PB8, and may provide a corresponding one of the high power supply voltages ELVDD1, ELVDD2, ELVDD3, ELVDD4, ELVDD5, ELVDD6, ELVDD7, and ELVDD8 to all the pixels included in the corresponding one of the pixel blocks PB1, PB2, PB3, PB4, PB5, PB6, PB7, and PB8. That is, the high power supply voltage lines HPSVL1, HPSVL2, HPSVL3, HPSVL4, HPSVL5, HPSVL6, HPSVL7, and HPSVL8 may respectively correspond to the pixel blocks PB1, PB2, PB3, PB4, PB5, PB6, PB7, and PB8.

A plurality of current measuring units 1200-1, 1200-2, 1200-3, 1200-4, 1200-5, 1200-6, 1200-7, and 1200-8 (also respectively labeled CMU1, CMU2, CMU3, CMU4, CMU5, CMU6, CMU7, and CMU8), and a control unit 1300 may be respectively disposed at the high power supply lines PSL1, PSL2, PSL3, PSL4, PSL5, PSL6, PSL7, and PSL8, and may measure a corresponding plurality of currents I1, I2, I3, I4, I5, I6, I7, and I8 respectively supplied from the high power supply lines PSL1, PSL2, PSL3, PSL4, PSL5, PSL6, PSL7, and PSL8 to the high power supply voltage lines HPSVL1, HPSVL2, HPSVL3, HPSVL4, HPSVL5, HPSVL6, HPSVL7, and HPSVL8.

When a crack occurs in one of the pixel blocks PB1, PB2, PB3, PB4, PB5, PB6, PB7, and PB8, the current supplied from the high power supply line corresponding to the pixel block having the crack may be greatly increased. For example, when a crack occurs in the second pixel block PB2, the current I2 supplied through the high power supply line PSL2 corresponding to the second pixel block PB2 may be greatly increased as illustrated in FIG. 12. In this case, a ratio of a measured value of the current I2 to block data for the second pixel block PB2 may be higher than a set or predetermined threshold value TVAL, and a burning protection circuit according to example embodiments may cut off power supply to a corresponding display device.

Figure 13:
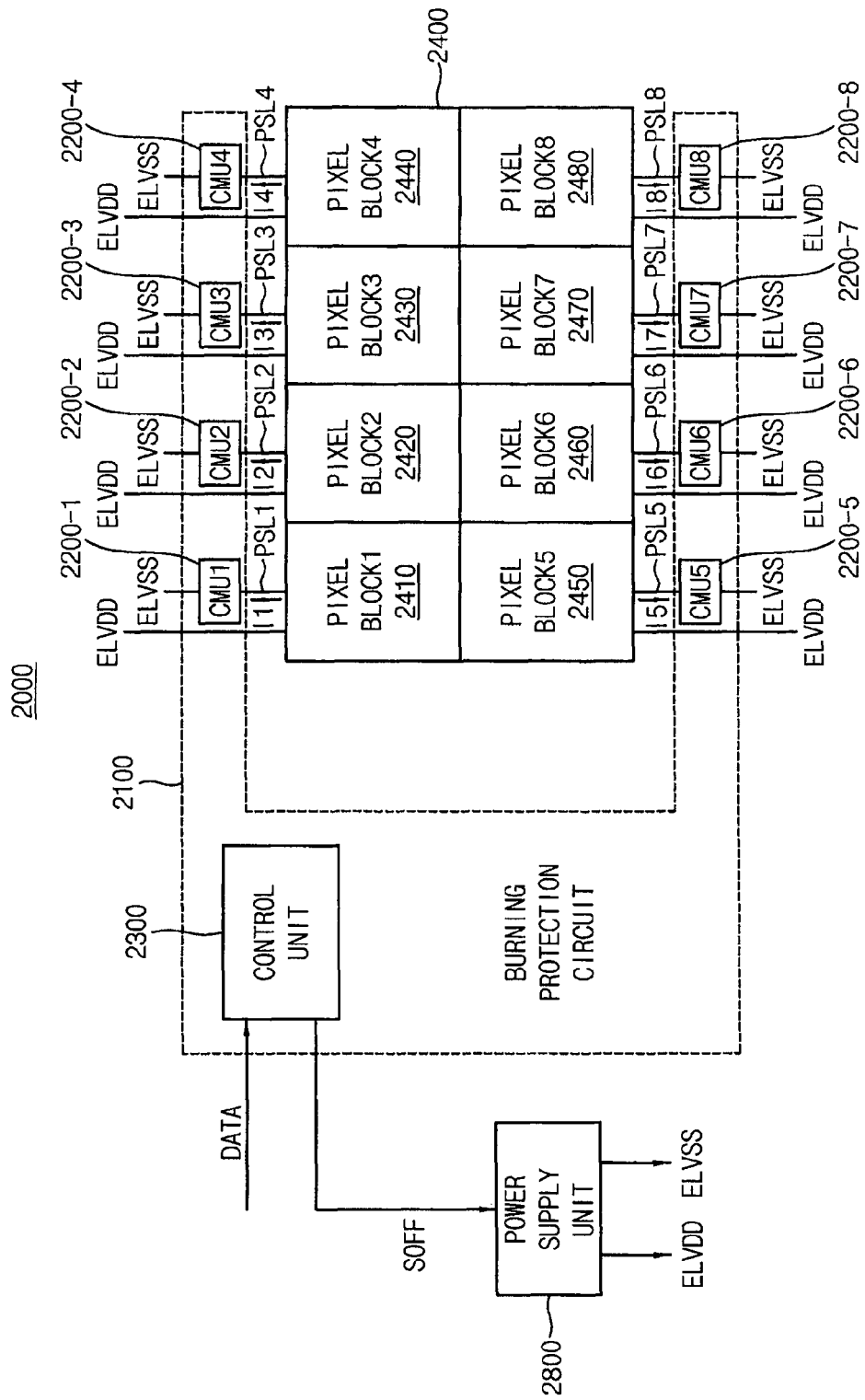
FIG. 13 is a block diagram illustrating another display device in accordance with example embodiments.
Figure 14:
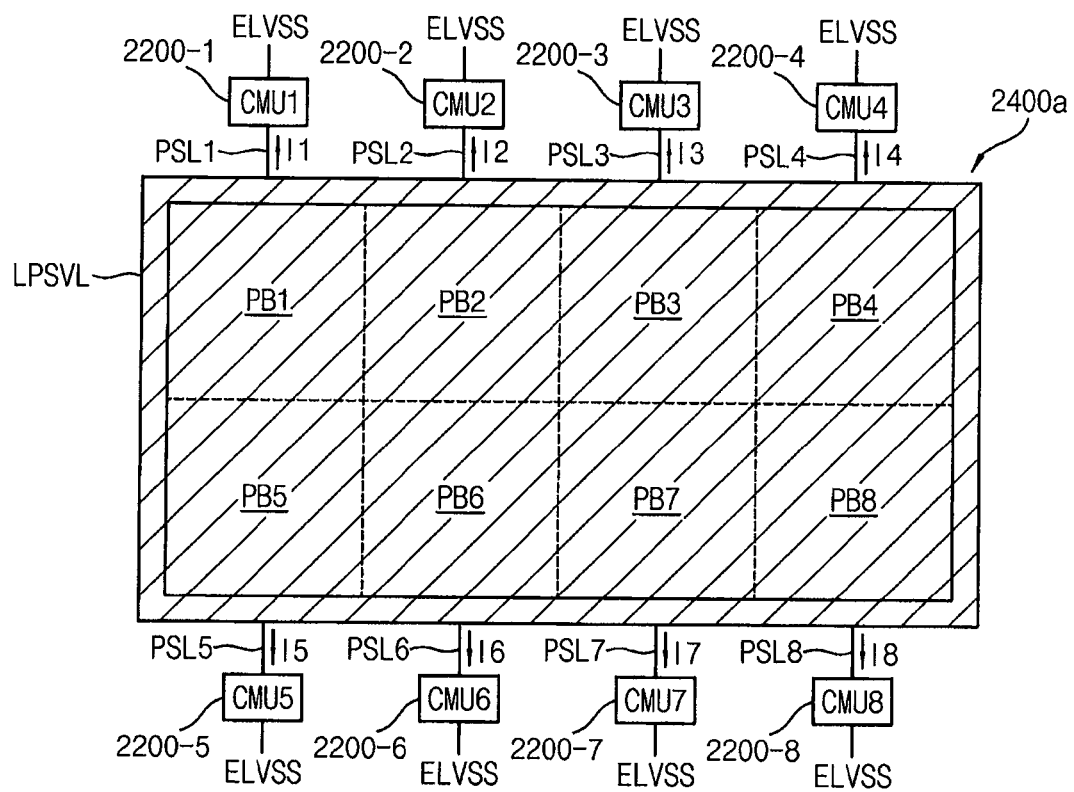
FIG. 14 is a diagram illustrating an example low power supply voltage line included in a display device in accordance with example embodiments.
Figure 15:
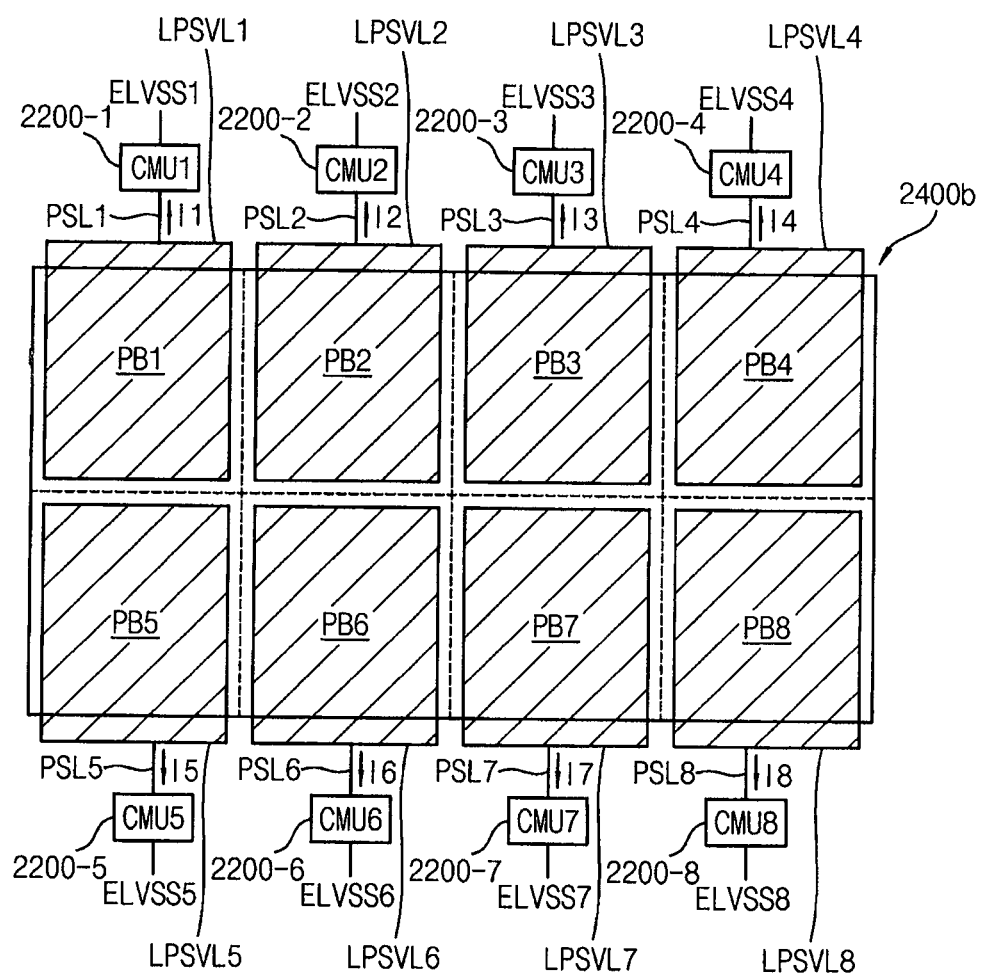
FIG. 15 is a diagram illustrating another example low power supply voltage line included in a display device in accordance with example embodiments.

FIG. 13 is a block diagram illustrating another display device 2000 in accordance with example embodiments, FIG. 14 is a diagram illustrating an example low power supply voltage line included in a display device in accordance with example embodiments, and FIG. 15 is a diagram illustrating another example low power supply voltage line included in a display device in accordance with example embodiments.

Referring to FIG. 13, the display device 2000 includes a display panel 2400 including a plurality of pixel blocks 2410, 2420, 2430, 2440, 2450, 2460, 2470, and 2480, a power supply unit 2800, and a burning protection circuit 2100. The display device 2000 of FIG. 13 may have substantially the same configuration as the display device 1000 of FIG. 8, except that a plurality of current measuring units 2200-1, 2200-2, 2200-3, 2200A, 2200-5, 2200-6, 2200-7, and 2200-8 (also respectively labeled CMU1, CMU2, CMU3, CMU4, CMU5, CMU6, CMU7, and CMU8) are respectively disposed at a corresponding plurality of low power supply lines PSL1, PSL2, PSL3, PSL4, PSL5, PSL6, PSL7, and PSL8.

The display panel 2400 may include a plurality of pixels that are arranged in a matrix having a plurality of rows and a plurality of columns. The pixels may be grouped into the pixel blocks 2410, 2420, 2430, 2440, 2450, 2460, 2470, and 2480 that are respectively supplied with power through a plurality of high power supply lines (see, e.g., the power lines connecting high power source voltage ELVDD to each of the pixel blocks 2410, 2420, 2430, 2440, 2450, 2460, 2470, and 2480 in FIG. 13) and a plurality of low power supply lines PSL1, PSL2, PSL3, PSL4, PSL5, PSL6, PSL7, and PSL8.

The power supply unit 2800 may provide a high power supply voltage ELVDD to the pixel blocks 2410, 2420, 2430, 2440, 2450, 2460, 2470, and 2480 through the corresponding high power supply lines, and may provide a low power supply voltage ELVSS to the pixel blocks 2410, 2420, 2430, 2440, 2450, 2460, 2470, and 2480 through the corresponding low power supply lines PSL1, PSL2, PSL3, PSL4, PSL5, PSL6, PSL7, and PSL8.

The burning protection circuit 2100 may detect an overcurrent (or an occurrence of the overcurrent), and may cut off the power supply to the display device 2000 when the overcurrent (or the occurrence of the overcurrent) is detected. The burning protection circuit 2100 may include the plurality of current measuring units 2200-1, 2200-2, 2200-3, 2200-4, 2200-5, 2200-6, 2200-7, and 2200-8, and a control unit 2300.

The current measuring units 2200-1, 2200-2, 2200-3, 2200-4, 2200-5, 2200-6, 2200-7, and 2200-8 may be respectively disposed at the low power supply lines PSL1, PSL2, PSL3, PSL4, PSL5, PSL6, PSL7, and PSL8, and may measure a corresponding plurality of currents I1, I2, I3, I4, I5, I6, I7, and I8 respectively flowing from the pixel blocks 2410, 2420, 2430, 2440, 2450, 2460, 2470, and 2480 to the low power supply lines PSL1, PSL2, PSL3, PSL4, PSL5, PSL6, PSL7, and PSL8.

In some example embodiments, as illustrated in FIG. 14, the display panel 2400a may include a low power supply voltage line LPSVL that is shared by a plurality of pixel blocks PB1, PB2, PB3, PB4, PB5, PB6, PB7, and PB8. The low power supply voltage line LPSVL may supply respective pixels included in the pixel blocks PB1, PB2, PB3, PB4, PB5, PB6, PB7, and PB8 with a low power supply voltage ELVSS provided from the corresponding low power supply lines PSL1, PSL2, PSL3, PSL4, PSL5, PSL6, PSL7, and PSL8.

That is, the low power supply voltage line LPSVL may be a single or integrated power supply voltage line corresponding to all the pixel blocks PB1, PB2, PB3, PB4, PB5, PB6, PB7, and PB8. For example, the low power supply voltage line LPSVL may be a transparent or reflective electrode that covers the entire surface of the display panel 2400a. The current measuring units 2200-1, 2200-2, 2200-3, 2200-4, 2200-5, 2200-6, 2200-7, and 2200-8 (also respectively labeled CMU1, CMU2, CMU3, CMU4, CMU5, CMU6, CMU7, and CMU8) may measure the corresponding currents I1, I2, I3, I4, I5, I6, I7, and I8 flowing from the integrated low power supply voltage line LPSVL to the low power supply lines PSL1, PSL2, PSL3, PSL4, PSL5, PSL6, PSL7, and PSL8, respectively.

In other example embodiments, as illustrated in FIG. 15, the display panel 2400b may include a plurality of low power supply voltage lines LPSVL1, LPSVL2, LPSVL3, LPSVL4, LPSVL5, LPSVL6, LPSVL7, and LPSVL8 that supply a corresponding plurality of pixel blocks PB1, PB2, PB3, PB4, PB5, PB6, PB7, and PB8 with a corresponding plurality of low power supply voltages ELVSS1, ELVSS2, ELVSS3, ELVSS4, ELVSS5, ELVSS6, ELVSS7, and ELVSS8 through a plurality of low power supply lines PSL1, PSL2, PSL3, PSL4, PSL5, PSL6, PSL7, and PSL8, respectively. That is, the low power supply voltage lines LPSVL1, LPSVL2, LPSVL3, LPSVL4, LPSVL5, LPSVL6, LPSVL7, and LPSVL8 may respectively correspond to the pixel blocks PB1, PB2, PB3, PB4, PB5, PB6, PB7, and PB8.

For example, each of the low power supply voltage lines LPSVL1, LPSVL2, LPSVL3, LPSVL4, LPSVL5, LPSVL6, LPSVL7, and LPSVL8 may be a transparent or reflective electrode that covers the entire surface of a corresponding one of the pixel blocks PB1, PB2, PB3, PB4, PB5, PB6, PB7, and PB8. The current measuring units 2200-1, 2200-2, 2200-3, 2200-4, 2200-5, 2200-6, 2200-7, and 2200-8 (also respectively labeled CMU1, CMU2, CMU3, CMU4, CMU5, CMU6, CMU7, and CMU8) may measure the corresponding currents I1, I2, I3, I4, I5, I6, I7, and I8 flowing from the low power supply voltage lines LPSVL1, LPSVL2, LPSVL3, LPSVL4, LPSVL5, LPSVL6, LPSVL7, and LPSVL8 to the low power supply lines PSL1, PSL2, PSL3, PSL4, PSL5, PSL6, PSL7, and PSL8, respectively.

Referring back to FIG. 13, the control unit 2300 may calculate a plurality of block data for the corresponding pixel blocks 2410, 2420, 2430, 2440, 2450, 2460, 2470, and 2480 based on pixel data DATA for the pixels, may calculate a plurality of ratios of the measured current values to the corresponding block data, and may determine whether an overcurrent occurs based on the ratios of the measured current values to the corresponding block data. When the overcurrent is decided to occur, the control unit 2300 may apply a power-off signal SOFF to the power supply unit 2800 to cut off the power supply to the display device 2000. Accordingly, a burn or a fire may be prevented in the display device 2000 even if a crack occurs in the display panel 2400, or a line (e.g., a power supply line) is abnormally shorted.

As described above, the display device 2000 according to example embodiments may determine whether the overcurrent occurs based on the ratios of the measured current values to the corresponding block data, thereby accurately detecting the overcurrent and securely protecting the display device 2000 from burning even if the display device 2000 is driven without a non-emission period (e.g., by a PESS method).

Figure 16:
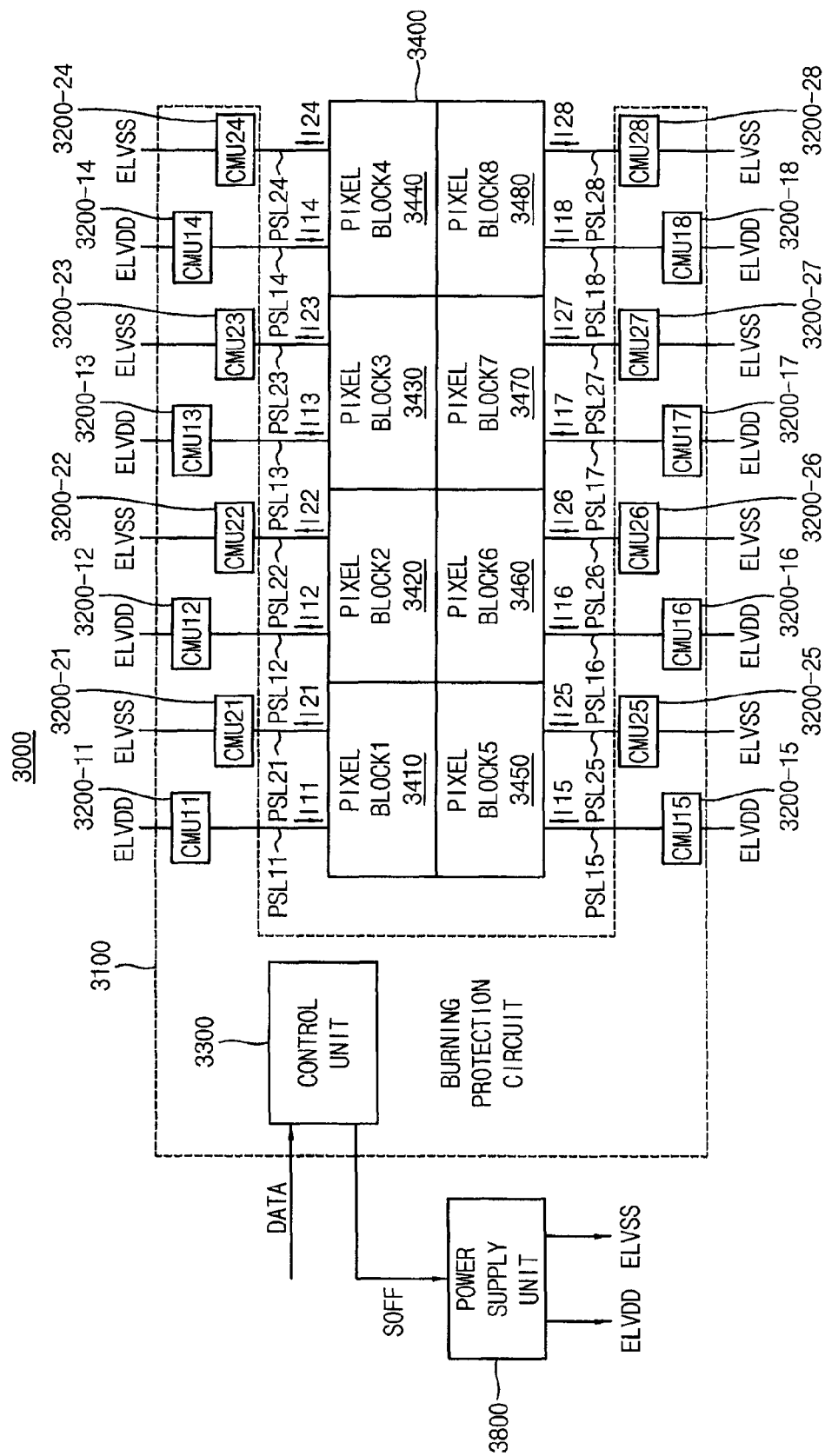
FIG. 16 is a block diagram illustrating yet another display device in accordance with example embodiments.

FIG. 16 is a block diagram illustrating yet another display device 3000 in accordance with example embodiments.

Referring to FIG. 16, the display device 3000 includes a display panel 3400 including a plurality of pixel blocks 3410, 3420, 3430, 3440, 3450, 3460, 3470, and 3480, a power supply unit 3800, and a burning protection circuit 3100. The display device 3000 of FIG. 16 may have substantially the same configuration as the display device 1000 of FIG. 8, except that a plurality of first current measuring units 3200-11, 3200-12, 3200-13, 3200-14, 3200-15, 3200-16, 3200-17, and 3200-18 (also respectively labeled CMU11, CMU12, CMU13, CMU14, CMU15, CMU16, CMU17, and CMU18) are respectively disposed at a plurality of high power supply lines PSL11, PSL12, PSL13, PSL14, PSL15, PSL16, PSL17, and PSL18, and a plurality of second current measuring units 3200-21, 3200-22, 3200-23, 3200-24, 3200-25, 3200-26, 3200-27, and 3200-28 (also respectively labeled CMU21, CMU22, CMU23, CMU24, CMU25, CMU26, CMU27, and CMU28) are respectively disposed at a plurality of low power supply lines PSL21, PSL22, PSL23, PSL24, PSL25, PSL26, PSL27, and PSL28.

The display panel 3400 may include a plurality of pixels that are arranged in a matrix having a plurality of rows and a plurality of columns. The pixels may be grouped into the pixel blocks 3410, 3420, 3430, 3440, 3450, 3460, 3470, and 3480 that are respectively supplied with power through the high power supply lines PSL11, PSL12, PSL13, PSL14, PSL15, PSL16, PSL17, and PSL18 and the low power supply lines PSL21, PSL22, PSL23, PSL24, PSL25, PSL26, PSL27, and PSL28.

The power supply unit 3800 may provide a high power supply voltage ELVDD to the pixel blocks 3410, 3420, 3430, 3440, 3450, 3460, 3470, and 3480 through the high power supply lines PSL11, PSL12, PSL13, PSL14, PSL15, PSL16, PSL17, and PSL18, respectively, and may provide a low power supply voltage ELVSS to the pixel blocks 3410, 3420, 3430, 3440, 3450, 3460, 3470, and 3480 through the low power supply lines PSL21, PSL22, PSL23, PSL24, PSL25, PSL26, PSL27, and PSL28, respectively.

The burning protection circuit 3100 may detect an overcurrent (or an occurrence of the overcurrent), and may cut off the power supply to the display device 3000 when the overcurrent (or the occurrence of the overcurrent) is detected. The burning protection circuit 3100 may include the first current measuring units 3200-11, 3200-12, 3200-13, 3200-14, 3200-15, 3200-16, 3200-17, and 3200-18 respectively coupled to the high power supply lines PSL11, PSL12, PSL13, PSL14, PSL15, PSL16, PSL17, and PSL18, the second current measuring units 3200-21, 3200-22, 3200-23, 3200-24, 3200-25, 3200-26, 3200-27, and 3200-28 respectively coupled to the low power supply lines PSL21, PSL22, PSL23, PSL24, PSL25, PSL26, PSL27, and PSL28, and a control unit 3300.

The first current measuring units 3200-11, 3200-12, 3200-13, 3200-14, 3200-15, 3200-16, 3200-17, and 3200-18 may be respectively disposed at the high power supply lines PSL11, PSL12, PSL13, PSL14, PSL15, PSL16, PSL17, and PSL18, and may measure a corresponding plurality of first currents I11, I12, I13, I14, I15, I16, I17, and I18 (e.g., high power currents) respectively flowing from the high power supply lines PSL11, PSL12, PSL13, PSL14, PSL15, PSL16, PSL17, and PSL18 to the corresponding pixel blocks 3410, 3420, 3430, 3440, 3450, 3460, 3470, and 3480.

The second current measuring units 3200-21, 3200-22, 3200-23, 3200-24, 3200-25, 3200-26, 3200-27, and 3200-28 may be respectively disposed at the low power supply lines PSL21, PSL22, PSL23, PSL24, PSL25, PSL26, PSL27, and PSL28, and may measure a corresponding plurality of second currents I21, I22, I23, I24, I25, I26, I27, and I28 (e.g., low power currents) respectively flowing from the pixel blocks 3410, 3420, 3430, 3440, 3450, 3460, 3470, and 3480 to the corresponding low power supply lines PSL21, PSL22, PSL23, PSL24, PSL25, PSL26, PSL27, and PSL28.

The control unit 3300 may calculate a plurality of block data for the corresponding pixel blocks 3410, 3420, 3430, 3440, 3450, 3460, 3470, and 3480 based on pixel data DATA for the pixels, may calculate a plurality of first ratios of measured values of the first currents I11, I12, I13, I14, I15, I16, I17, and I18 to the corresponding block data, may calculate a plurality of second ratios of measured values of the second currents I21, I22, I23, I24, I25, I26, I27, and I28 to the corresponding block data, and may determine whether an overcurrent occurs based on the first ratios and the second ratios. When the overcurrent is decided to occur, the control unit 3300 may apply a power-off signal SOFF to the power supply unit 3800 to cut off the power supply to the display device 3000. Accordingly, a burn or a fire may be prevented in the display device 3000 even if a crack occurs in the display panel 3400, or a line is abnormally shorted.

As described above, the display device 3000 according to example embodiments may determine whether the overcurrent occurs based on the ratios of the measured current values to the corresponding block data, thereby accurately detecting the overcurrent and securely protecting the display device 3000 from burning even if the display device 3000 is driven without a non-emission period (e.g., by a PESS method).

Figure 17:
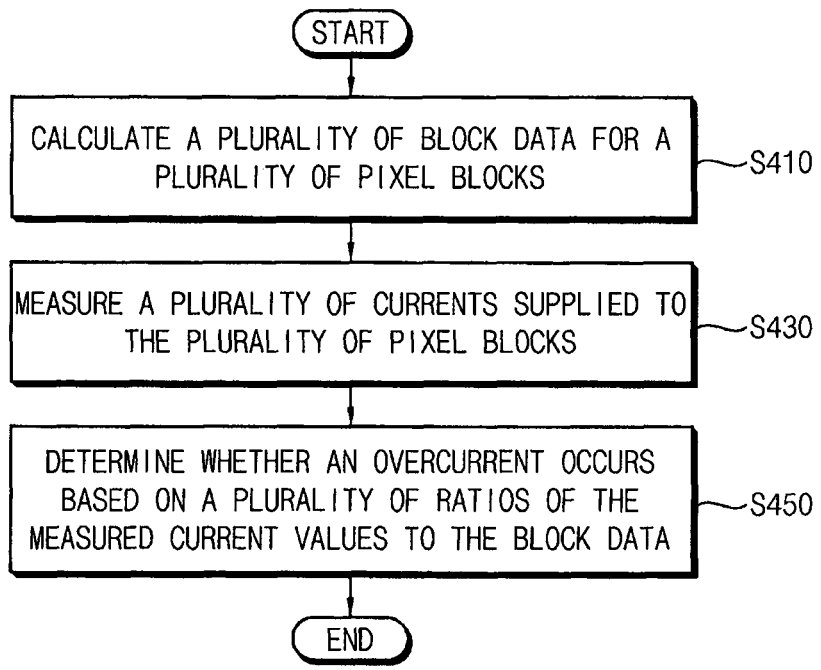
FIG. 17 is a flow chart illustrating an example method of protecting a display device from burning in accordance with example embodiments.

FIG. 17 is a flow chart illustrating an example method of protecting a display device from burning in accordance with example embodiments.

Referring to FIG. 17, in a display device including a plurality of pixel blocks respectively supplied with power through a plurality of corresponding power supply lines, a burning protection circuit calculates a corresponding plurality of block data for the pixel blocks based on pixel data for a plurality of pixels (S410). For example, each block data may be the sum, the average, or a normalized value of the pixel data for the pixels included in a corresponding pixel block.

The burning protection circuit generates a plurality of measured current values by measuring a corresponding plurality of currents respectively supplied to the pixel blocks through the power supply lines (S430). For example, the burning protection circuit may measure a plurality of first currents flowing from a corresponding plurality of high power supply lines to the corresponding pixel blocks, a plurality of second currents flowing from the corresponding pixel blocks to a corresponding plurality of low power supply lines, or both of the first currents and the second currents.

The burning protection circuit calculates a plurality of ratios of the measured current values to the corresponding block data, and determines whether an overcurrent occurs based on the ratios of the measured current values to the corresponding block data (S450). In some example embodiments, the burning protection circuit may decide that the overcurrent occurs if at least one of the ratios of the measured current values to the corresponding block data exceeds a set or predetermined threshold value. When the occurrence of the overcurrent is detected, the burning protection circuit may cut off the power supplied to the pixel blocks or the display device.

As described above, in the method of protecting the display device from burning according to example embodiments, the overcurrent is detected based on the ratios of the measured current values to the corresponding block data, and thus, even if the display device is driven without the non-emission period, the overcurrent may be accurately detected.

Figure 18:
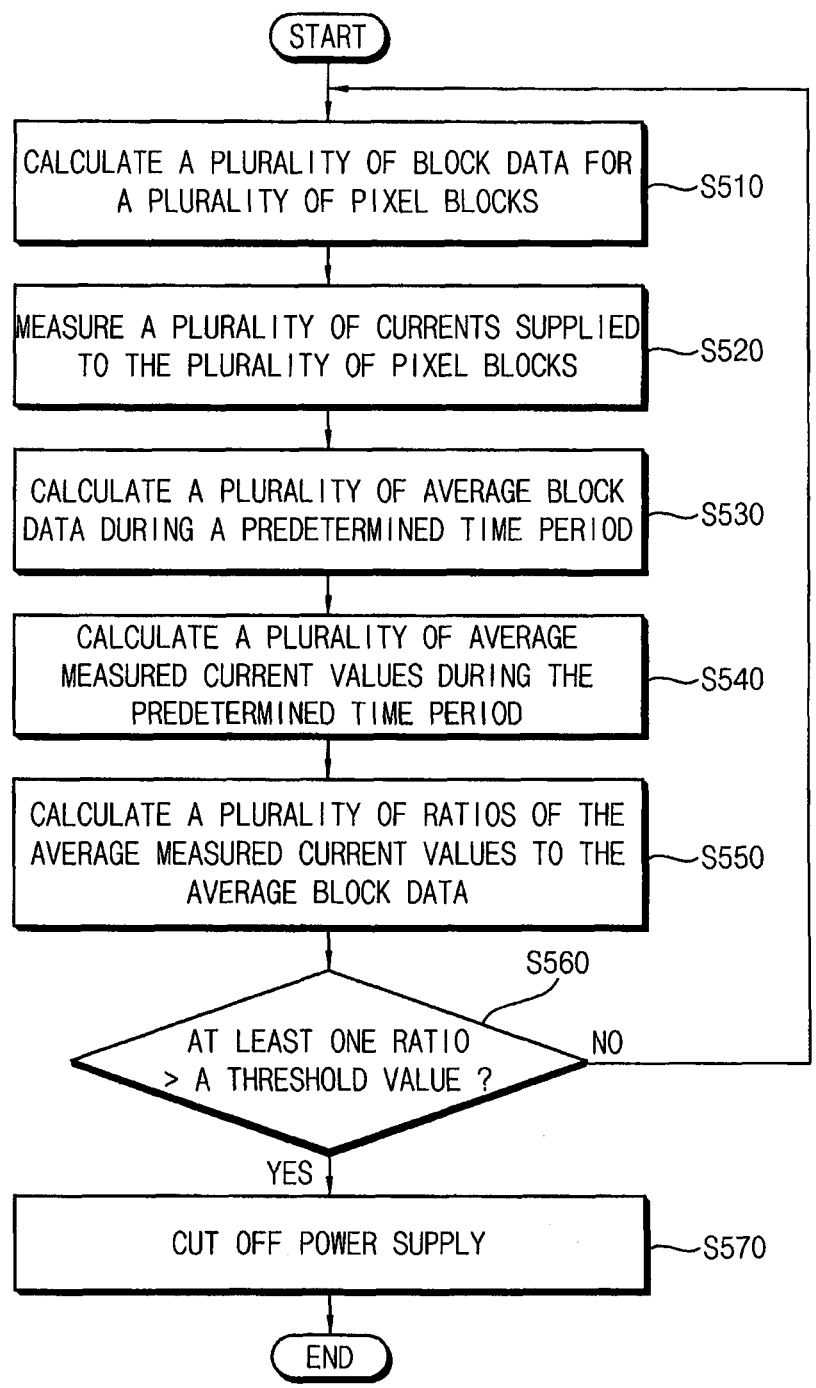
FIG. 18 is a flow chart illustrating another example method of protecting a display device from burning in accordance with example embodiments.

FIG. 18 is a flow chart illustrating another example method of protecting a display device from burning in accordance with example embodiments.

Referring to FIG. 18, in a display device including a plurality of pixel blocks respectively supplied with power through a plurality of corresponding power supply lines, a burning protection circuit may calculate a corresponding plurality of block data for the pixel blocks based on pixel data for a plurality of pixels (S510). The burning protection circuit may generate a plurality of measured current values by measuring a corresponding plurality of currents respectively supplied to the pixel blocks through the power supply lines (S520).

The burning protection circuit may generate a plurality of average block data by respectively averaging pluralities of corresponding individual block data during a set or predetermined time period (S530), may generate a corresponding plurality of average measured current values by respectively averaging pluralities of individual measured current values for the pixel blocks during the set or predetermined time period (S540), and may calculate a corresponding plurality of average ratios of the average measured current values to the corresponding average block data (8550). In some example embodiments, the set or predetermined time period may correspond to one frame, or two or more frames.

The burning protection circuit may determine whether an overcurrent occurs by comparing the respective average ratios of the average measured current values to the corresponding average block data with a set or predetermined threshold value (S560). For example, the burning protection circuit may decide that the overcurrent does not occur if all the average ratios of the average measured current values to the corresponding average block data are less than or equal to a set or predetermined threshold value (S560: NO), and may decide that the overcurrent occurs if at least one of the average ratios of the average measured current values to the corresponding average block data exceeds the set or predetermined threshold value (S560: YES).

When the overcurrent is decided to occur, the burning protection circuit may cut off the power supplied to the pixel blocks or the display device to protect the display device from burning (S570).

Figure 19:
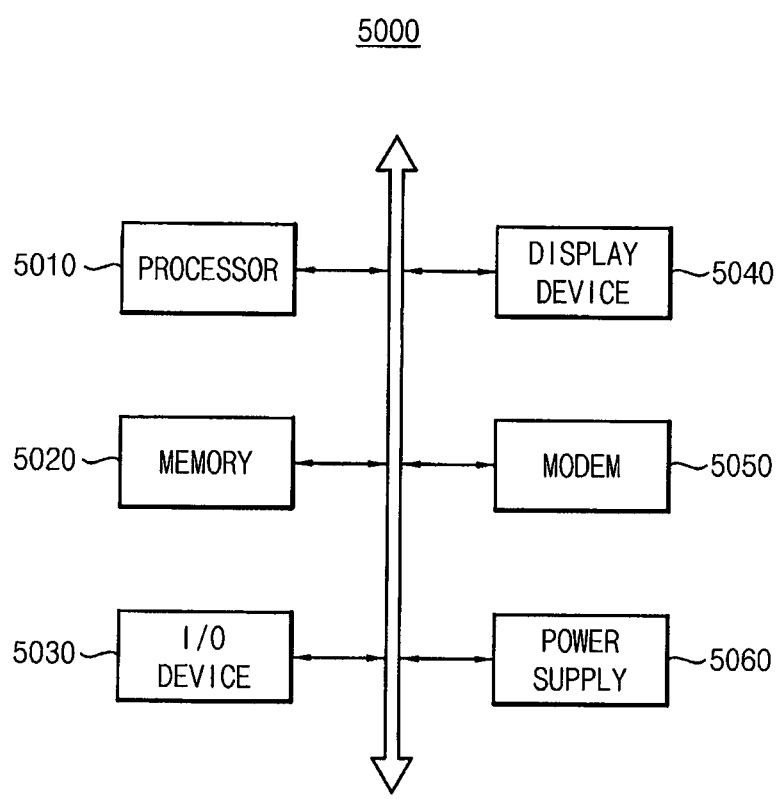
FIG. 19 is a block diagram illustrating an electronic device including a display device in accordance with example embodiments.

FIG. 19 is a block diagram illustrating an electronic device 5000 including a display device 5040 in accordance with example embodiments.

Referring to FIG. 19, the electronic device 5000 includes a processor 5010 and the display device 5040. In some example embodiments, the electronic device 5000 may further include a memory device 5020, an input/output device 5030, a modem 5050, and a power supply 5060.

The processor 5010 may perform specific calculations or tasks. For example, the processor 5010 may be a system-on-chip (SOC), an application processor, a media processor, a microprocessor, a central process unit (CPU), a digital signal processor, or the like. The processor 5010 may be coupled to the memory device 5020 via an address bus, a control bus, and/or a data bus. For example, the memory device 5020 may be implemented by a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

Further, the processor 5010 may be coupled to an extension bus, such as a peripheral component interconnect (PCI) bus. The processor 5010 may control the input/output device 5030 including an input device, such as a keyboard, a mouse, a keypad, etc., and an output device, such as a printer, a speaker, etc., via the extension bus. The processor 5010 may be further coupled to the display device 5040. The display device 5040 may accurately determine whether an overcurrent occurs based on a plurality of ratios of a plurality of measured current values to a corresponding plurality of block data, and thus may protect the electronic device 5000 from burning.

Further, the processor 5010 may control a storage device, such as a solid state drive, a hard disk drive, a CD-ROM, etc., via the extension bus. The modem 5050 may perform wired or wireless communications with an external device. The power supply 5060 may supply power to the electronic device 5000. In some example embodiments, the electronic device 5000 may further include an application chipset, a camera image processor (CIS), etc.

According to example embodiments, the electronic device 5000 may be any electronic device including the display device 5040, such as a digital television (TV), a 3D TV, a personal computer (PC), a home appliance, a laptop computer, a tablet computer, a cellular phone, a smart phone, a personal digital assistant (PDA), a portable multimedia player (PMP), a digital camera, a music player, a portable game console, a navigation device, etc.

The foregoing is illustrative of example embodiments of the present invention, and is not to be construed as limiting thereof. Although a few example embodiments have been described, those skilled in the art will readily appreciate that many modifications are possible in the example embodiments without materially departing from the novel teachings and features of the present invention. Accordingly, all such modifications are intended to be included within the scope of the present invention as defined in the claims and their equivalents.

In the claims, means-plus-function clauses are intended to cover the structures described herein as performing the recited function and not only structural equivalents but also equivalent structures. Therefore, it is to be understood that the foregoing is illustrative of example embodiments of the present invention, and the present invention is not to be construed as limited to the specific embodiments disclosed, and that modifications to the disclosed example embodiments, as well as other example embodiments, are intended to be included within the scope of the present invention. The present invention is defined by the following claims, with equivalents of the claims to be included therein.

What is claimed is:

1. A burning protection circuit of a display device comprising a plurality of pixel blocks, each of the pixel blocks comprising a plurality of pixels, the pixel blocks being respectively supplied with power through a plurality of power supply lines, the burning protection circuit comprising:
   a plurality of current measuring units configured to respectively generate a plurality of measured current values by respectively measuring a plurality of currents respectively supplied to the pixel blocks through the power supply lines; and
   a control unit configured to:
      respectively generate a plurality of block data for the pixel blocks based on pixel data for the pixels of corresponding ones of the pixel blocks; and
      determine whether an overcurrent occurs based on a plurality of ratios of the measured current values to corresponding ones of the block data, the overcurrent being determined not to occur when the ratios are substantially the same as each other and being determined to occur when at least one of the ratios differs by more than a predetermined threshold value from remaining ones of the ratios.

2. The burning protection circuit of claim 1, wherein the control unit is further configured to determine that the overcurrent occurs when at least one of the ratios exceeds a threshold value.

3. The burning protection circuit of claim 2, wherein the control unit is further configured to cut off the power supplied to the pixel blocks when the control unit determines that the overcurrent occurs.

4. The burning protection circuit of claim 1, wherein
   each of the current measuring units is further configured to generate a plurality of individual measured current values by measuring a plurality of individual currents supplied to a corresponding one of the pixel blocks through a corresponding one of the power supply lines during a time period, and the control unit is further configured to:
   generate a plurality of individual block data for each pixel block of the pixel blocks based on the pixel data for the pixels of the pixel block during the time period;
   generate a plurality of average block data by respectively averaging the individual block data for the pixel blocks;
   generate a plurality of average measured current values by respectively averaging the individual measured current values for the pixel blocks; and
   determine whether the overcurrent occurs based on a plurality of average ratios of the average measured current values to corresponding ones of the average block data.

5. The burning protection circuit of claim 4, wherein the time period corresponds to one frame.

6. The burning protection circuit of claim 1, wherein each of the current measuring units comprises:
   a current sensing device configured to:
      sense a corresponding one of the currents flowing through a corresponding one of the power supply lines; and
      generate a voltage corresponding to the corresponding one of the currents; and
   a converter configured to convert the voltage generated by the current sensing device into a corresponding one of the measured current values.

7. The burning protection circuit of claim 6, wherein the current sensing device comprises a Hall device or a sense resistor.

8. The burning protection circuit of claim 1, wherein the control unit comprises:
   a block data calculating unit configured to respectively generate the block data for the pixel blocks based on the pixel data for the pixels of corresponding ones of the pixel blocks; and
   an overcurrent determining unit configured to:
      receive the measured current values from the current measuring units;
      receive the block data from the block data calculating unit;
      generate the ratios; and
      determine whether the overcurrent occurs by comparing each of the ratios with a threshold value.

9. The burning protection circuit of claim 1, wherein the control unit comprises:
   a block data calculating unit configured to:
      generate a plurality of individual block data for each pixel block of the pixel blocks based on the pixel data for the pixels of the pixel block during a time period; and
      generate a plurality of average block data by respectively averaging the individual block data for the pixel blocks;
   an average current calculating unit configured to:
      receive a plurality of individual measured current values for the time period for each of the pixel blocks from corresponding ones of the current measuring units; and
      generate a plurality of average measured current values by respectively averaging the individual measured current values for the pixel blocks; and
   an overcurrent determining unit configured to:
      receive the average measured current values from the average current calculating unit;
      receive the average block data from the block data calculating unit;
      generate a plurality of average ratios of the average measured current values to corresponding ones of the average block data; and
      determine whether the overcurrent occurs by comparing each of the average ratios with a threshold value.

10. The burning protection circuit of claim 1, wherein the power supply lines comprise a corresponding plurality of high power supply lines and a corresponding plurality of low power supply lines, and
wherein the current measuring units are further configured to respectively measure the currents respectively supplied to the pixel blocks through the high power supply lines.

11. The burning protection circuit of claim 1, wherein the power supply lines comprise a corresponding plurality of high power supply lines and a corresponding plurality of low power supply lines, and
wherein the current measuring units are further configured to respectively measure the currents respectively supplied to the pixel blocks through the low power supply lines.

12. The burning protection circuit of claim 1, wherein the power supply lines comprise a corresponding plurality of high power supply lines and a corresponding plurality of low power supply lines,
wherein the currents comprise a corresponding plurality of high power currents and a corresponding plurality of low power currents, and
wherein the current measuring units are further configured to respectively measure the high power currents respectively supplied to the pixel blocks through the high power supply lines and to respectively measure the low power currents respectively supplied to the pixel blocks through the low power supply lines.

13. A display device comprising:
   a display panel comprising a plurality of pixel blocks, each of the pixel blocks comprising a plurality of pixels;
   a power supply unit configured to supply power to the pixel blocks through a corresponding plurality of power supply lines; and
   a burning protection circuit configured to:
      respectively generate a plurality of block data for the pixel blocks based on pixel data for the pixels of corresponding ones of the pixel blocks;
      generate a plurality of measured current values by respectively measuring a plurality of currents respectively supplied to the pixel blocks through the power supply lines; and
      determine whether an overcurrent occurs based on a plurality of ratios of the measured current values to corresponding ones of the block data, the overcurrent being determined not to occur when the ratios are substantially the same as each other and being determined to occur when at least one of the ratios differs by more than a predetermined threshold value from remaining ones of the ratios.

14. The display device of claim 13, wherein the burning protection circuit is further configured to determine that the overcurrent occurs when at least one of the ratios exceeds a threshold value.

15. The display device of claim 14, wherein the burning protection circuit is further configured to control the power supply unit to cut off the power supplied to the pixel blocks when the burning protection circuit determines that the overcurrent occurs.

16. The display device of claim 13,
wherein the display panel comprises a power supply voltage line coupled to the power supply lines and corresponding to all of the pixel blocks, and
wherein the burning protection circuit comprises a plurality of current measuring units configured to respectively measure the currents supplied to the pixel blocks through the power supply voltage line from the power supply lines.

17. The display device of claim 13,
wherein the display panel comprises a plurality of power supply voltage lines respectively coupled to the power supply lines and respectively corresponding to the pixel blocks, and
wherein the burning protection circuit comprises a plurality of current measuring units configured to respectively measure the currents respectively supplied to the pixel blocks through the power supply voltage lines from the power supply lines.

18. A method of protecting a display device from burning, the display device comprising a plurality of pixel blocks, each of the pixel blocks comprising a plurality of pixels, the pixel blocks being respectively supplied with power through a plurality of power supply lines, the method comprising:
respectively generating a plurality of block data for the pixel blocks based on pixel data for the pixels of corresponding ones of the pixel blocks;
generating a plurality of measured current values by respectively measuring a plurality of currents respectively supplied to the pixel blocks through the power supply lines; and
determining whether an overcurrent occurs based on a plurality of ratios of the measured current values to corresponding ones of the block data, the overcurrent being determined not to occur when the ratios are substantially the same as each other and being determined to occur when at least one of the ratios differs by more than a predetermined threshold value from remaining ones of the ratios.

19. The method of claim 18, wherein the determining of whether the overcurrent occurs comprises:
determining that the overcurrent occurs when at least one of the ratios exceeds a threshold value.

20. The method of claim 19, further comprising:
cutting off the power supplied to the pixel blocks after determining that the overcurrent occurs.

* * * * *